March 31, 1953　　　F. B. ANDERSON　　　2,633,534
VARIABLE FREQUENCY OSCILLATOR
Filed Feb. 1, 1950　　　　　　　　　　　　　　　18 Sheets-Sheet 1
FIG. 1
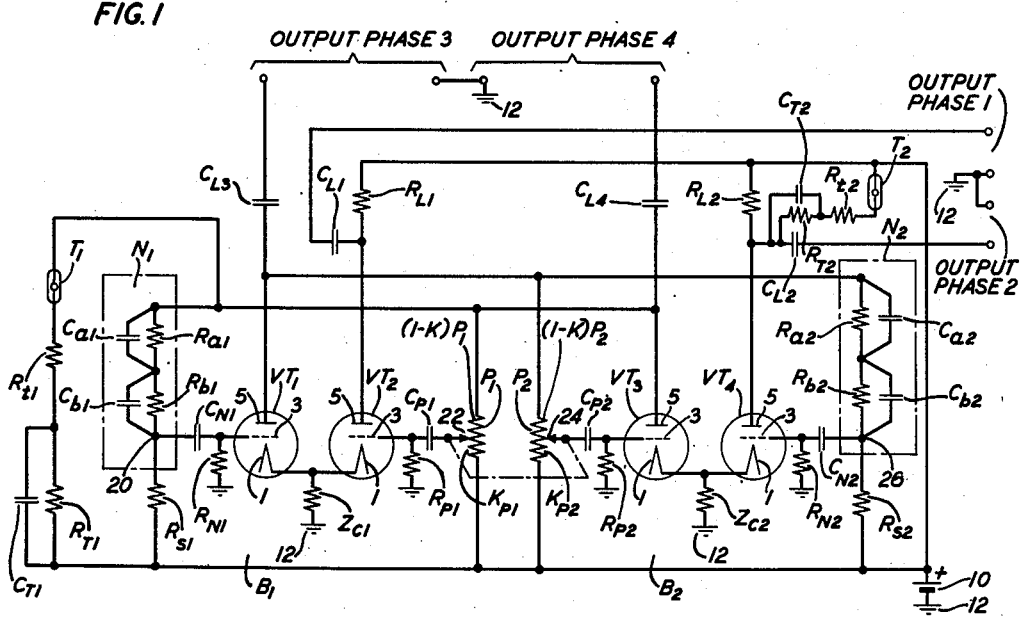
FIG. 1A　　FIG. 1B　　FIG. 1C　　FIG. 1D　　FIG. 1E
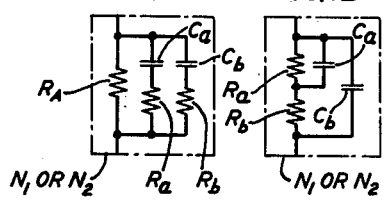 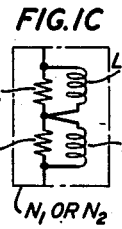 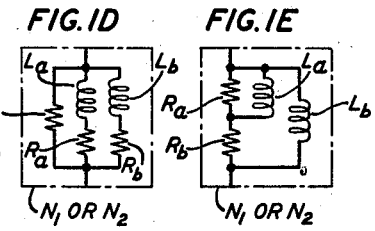
FIG. 32
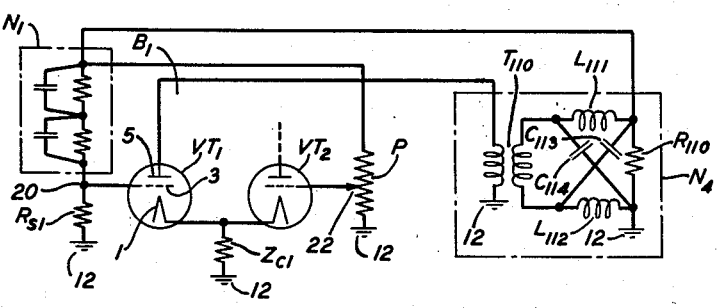
INVENTOR
F. B. ANDERSON
BY
W. J. O'Neill
ATTORNEY March 31, 1953   F. B. ANDERSON   2,633,534
VARIABLE FREQUENCY OSCILLATOR
Filed Feb. 1, 1950   18 Sheets-Sheet 2

INVENTOR
F. B. ANDERSON
BY W. J. O'Neill
ATTORNEY

March 31, 1953  F. B. ANDERSON  2,633,534
VARIABLE FREQUENCY OSCILLATOR
Filed Feb. 1, 1950  18 Sheets-Sheet 3
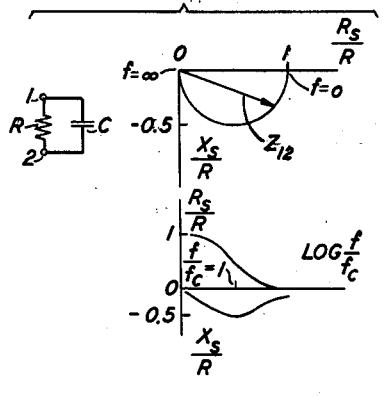
FIG.4A
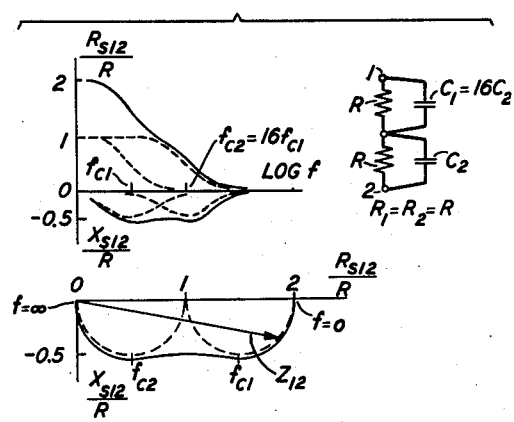
FIG.4B
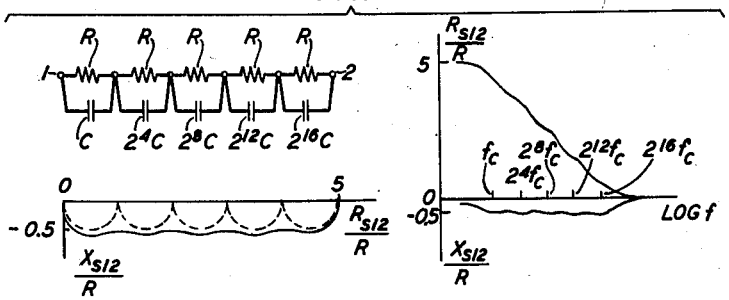
FIG.4C
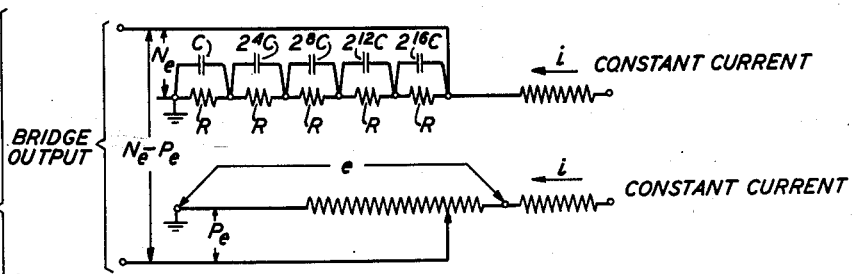
FIG.5A
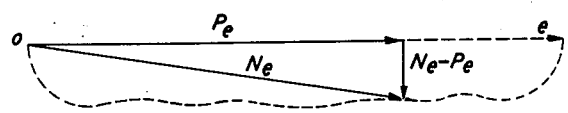
INVENTOR
F. B. ANDERSON
BY W. J. O'Neill
ATTORNEY March 31, 1953     F. B. ANDERSON     2,633,534
VARIABLE FREQUENCY OSCILLATOR
Filed Feb. 1, 1950     18 Sheets-Sheet 4
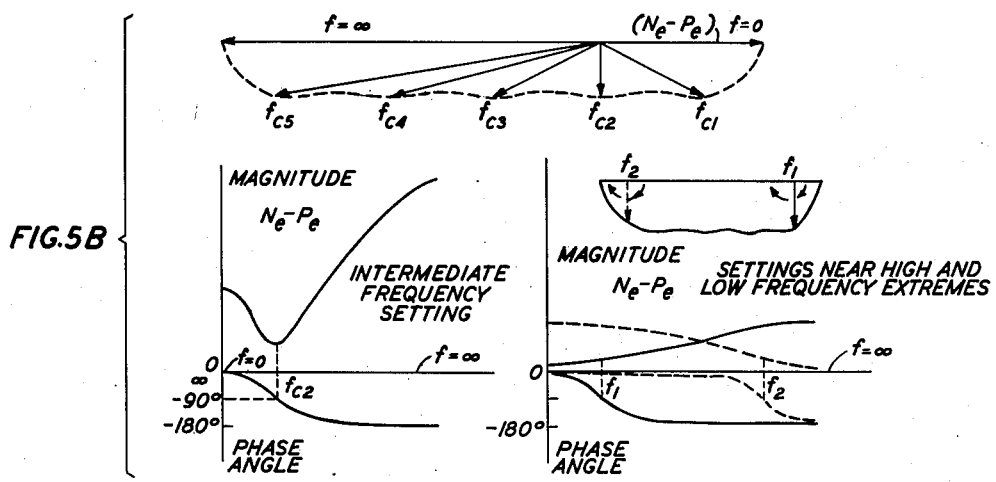
FIG. 5B
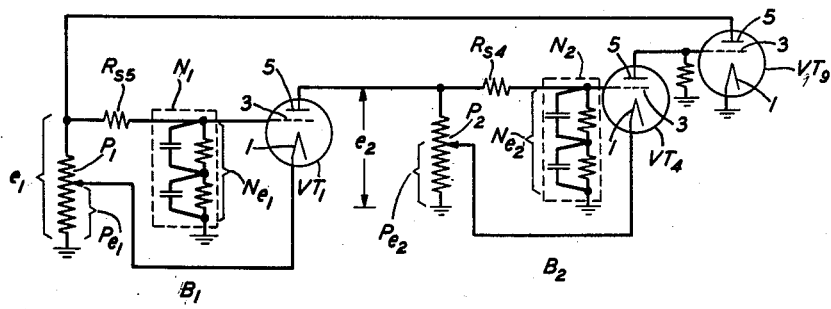
FIG. 6A
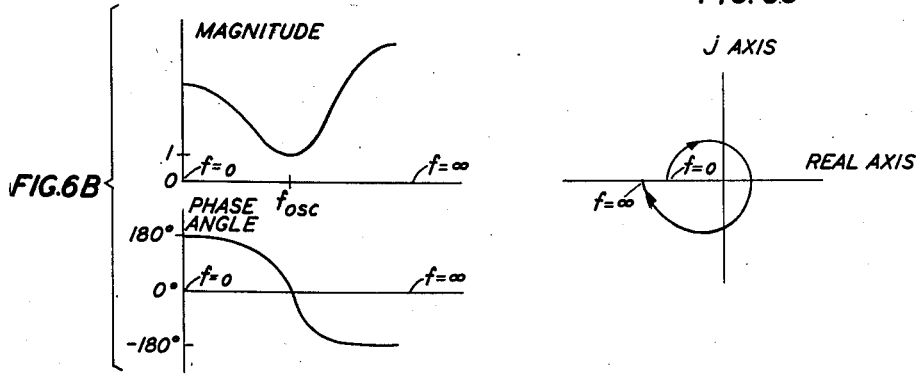
FIG. 6B
FIG. 6C
INVENTOR
F. B. ANDERSON
BY W. J. O'Neill
ATTORNEY March 31, 1953

F. B. ANDERSON 2,633,534

VARIABLE FREQUENCY OSCILLATOR

Filed Feb. 1, 1950

INVENTOR
F. B. ANDERSON
BY W. J. O'Neill
ATTORNEY

March 31, 1953  F. B. ANDERSON  2,633,534
VARIABLE FREQUENCY OSCILLATOR
Filed Feb. 1, 1950  18 Sheets-Sheet 6

INVENTOR
F. B. ANDERSON
BY W. J. O'Neill
ATTORNEY

FIG. 10A
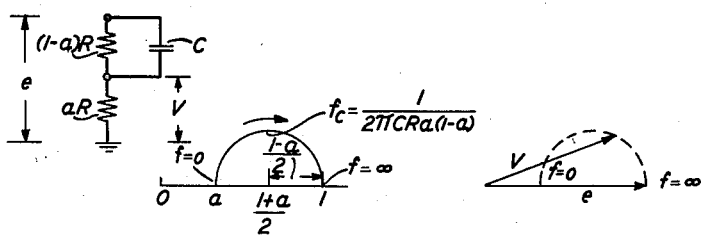
FIG. 10B
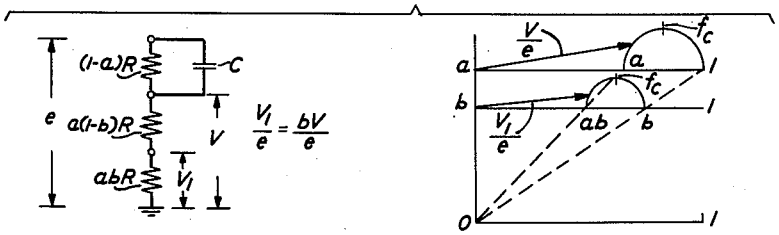
FIG. 10C
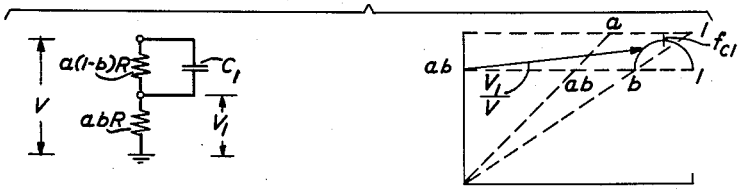
FIG. 10D
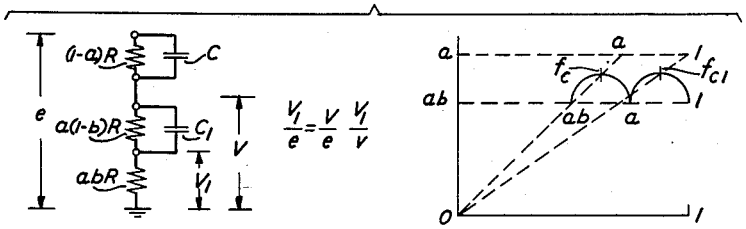
FIG. 10E March 31, 1953  F. B. ANDERSON  2,633,534
VARIABLE FREQUENCY OSCILLATOR
Filed Feb. 1, 1950  18 Sheets-Sheet 8
FIG. 11
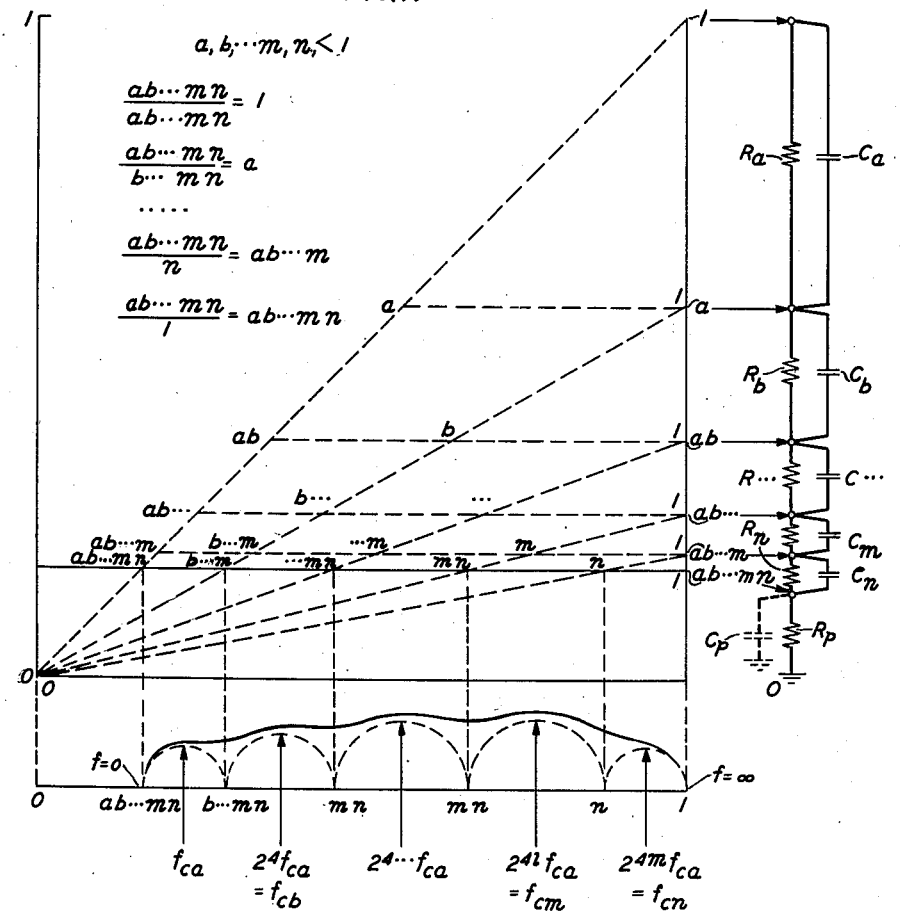
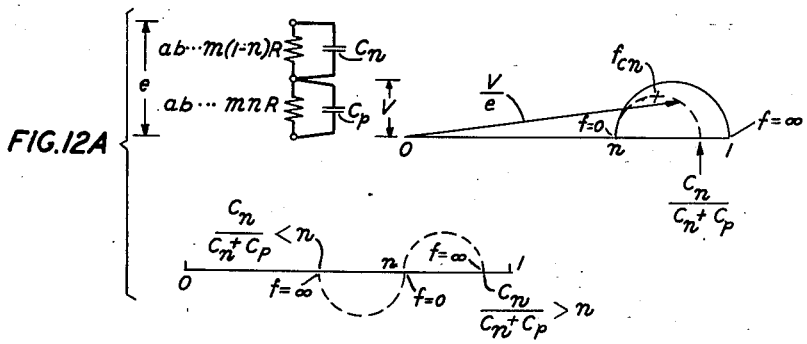
FIG. 12A
INVENTOR
F. B. ANDERSON
BY W. J. O'Neill
ATTORNEY

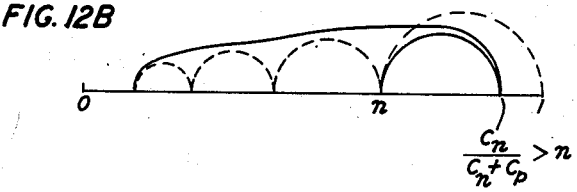
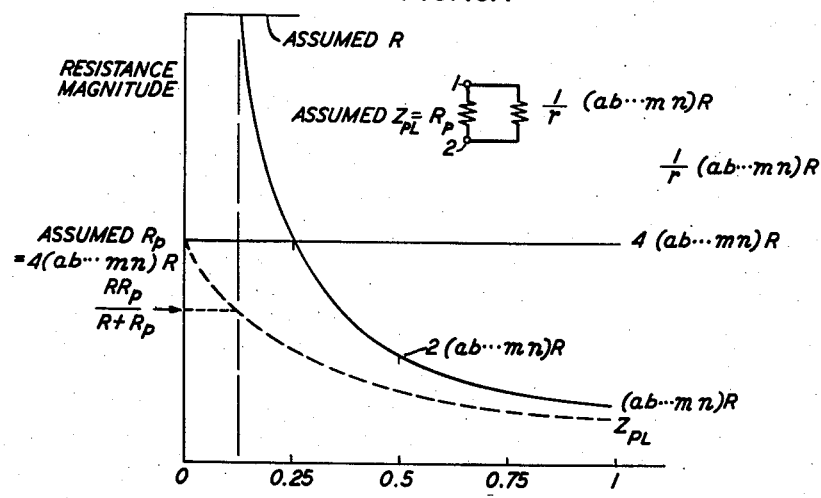
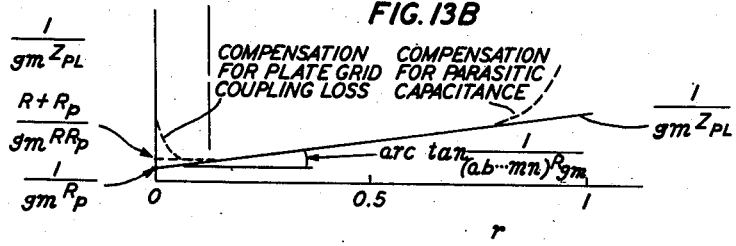
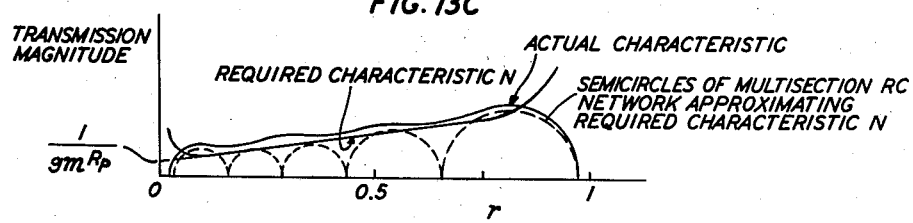

March 31, 1953  F. B. ANDERSON  2,633,534
VARIABLE FREQUENCY OSCILLATOR
Filed Feb. 1, 1950  18 Sheets-Sheet 10

INVENTOR
F. B. ANDERSON
BY W. J. O'Neill
ATTORNEY

March 31, 1953 F. B. ANDERSON 2,633,534
VARIABLE FREQUENCY OSCILLATOR
Filed Feb. 1, 1950 18 Sheets-Sheet 11
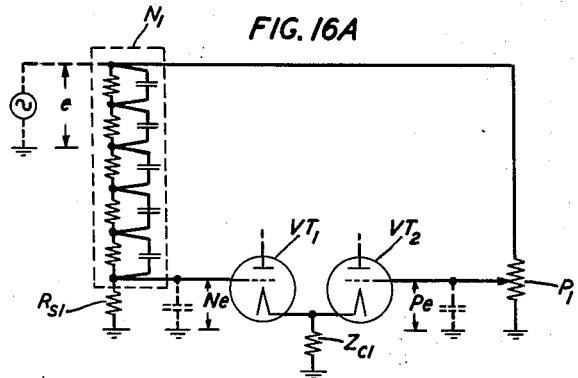
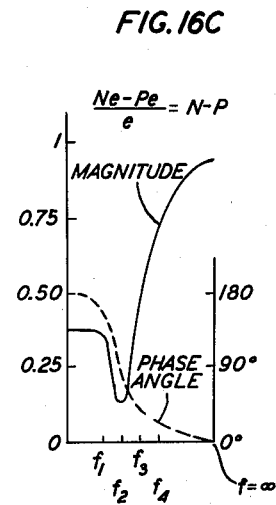
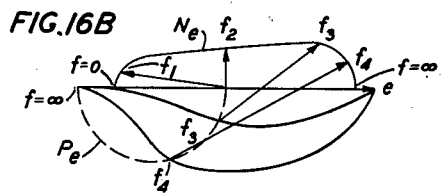
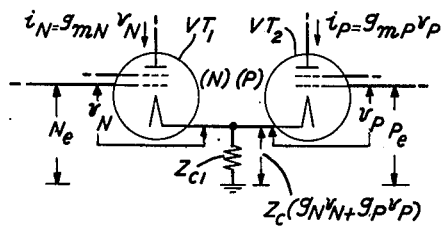
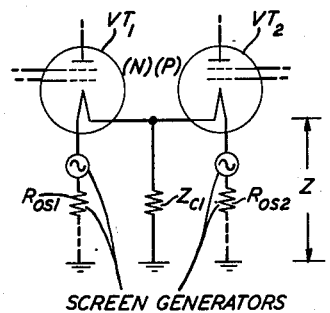
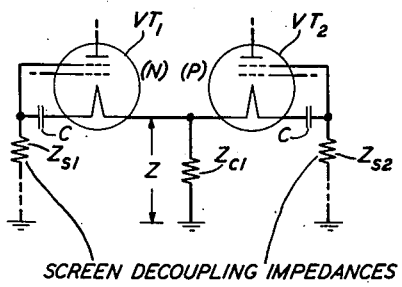
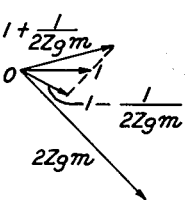
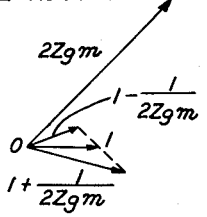
INVENTOR
F. B. ANDERSON
BY W. J. O'Neill
ATTORNEY March 31, 1953  F. B. ANDERSON  2,633,534
VARIABLE FREQUENCY OSCILLATOR
Filed Feb. 1, 1950

INVENTOR
F. B. ANDERSON
BY W. J. O'Neill
ATTORNEY

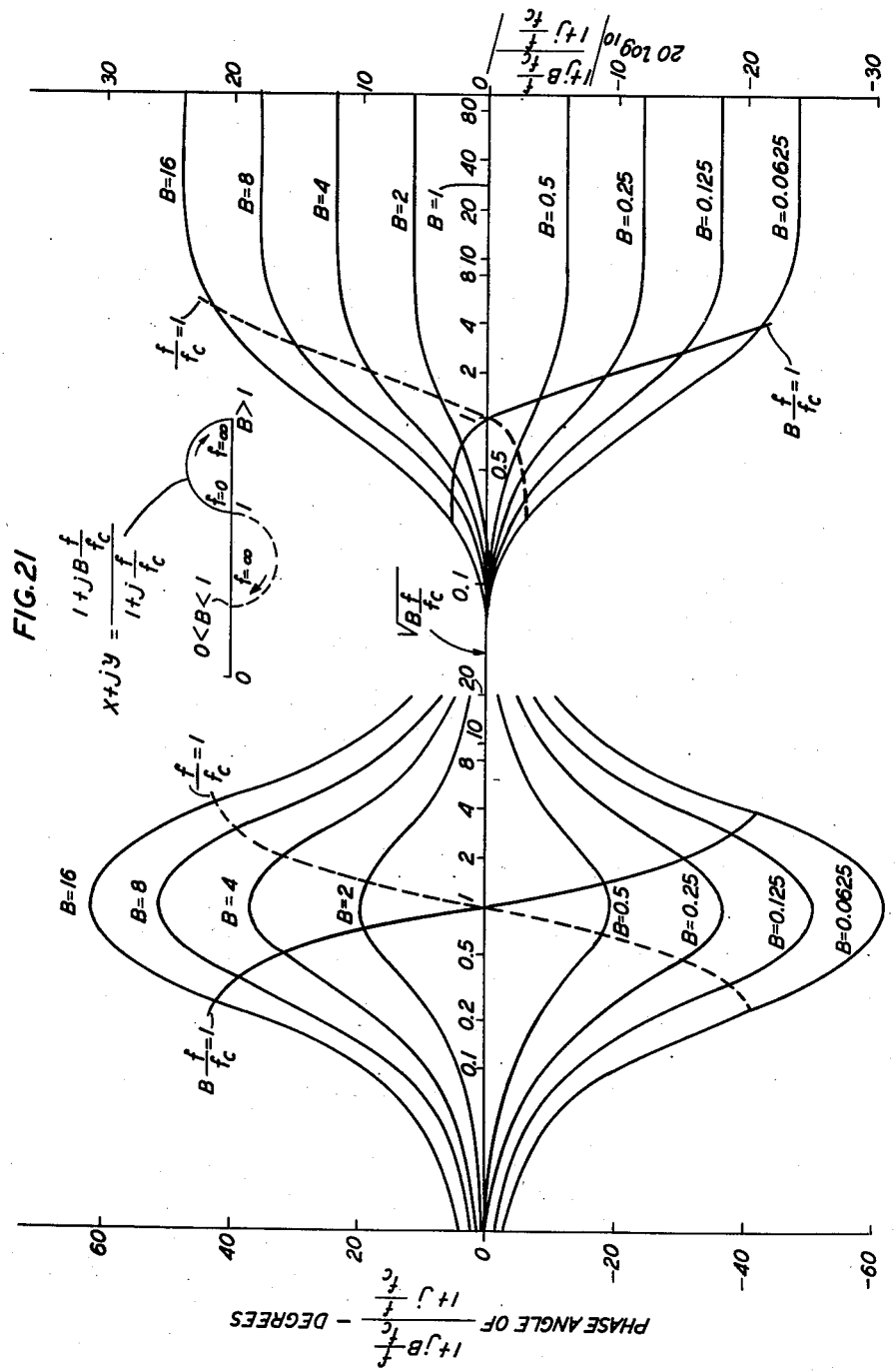

March 31, 1953     F. B. ANDERSON     2,633,534
VARIABLE FREQUENCY OSCILLATOR
Filed Feb. 1, 1950     18 Sheets-Sheet 14
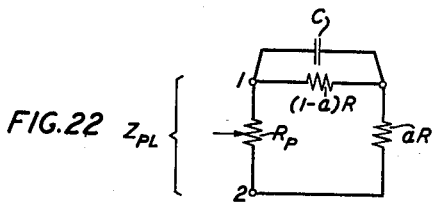
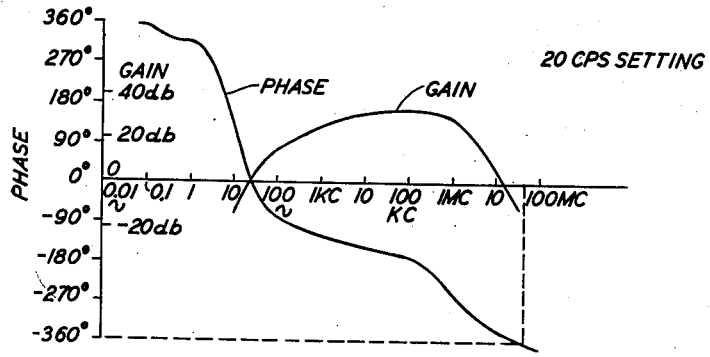
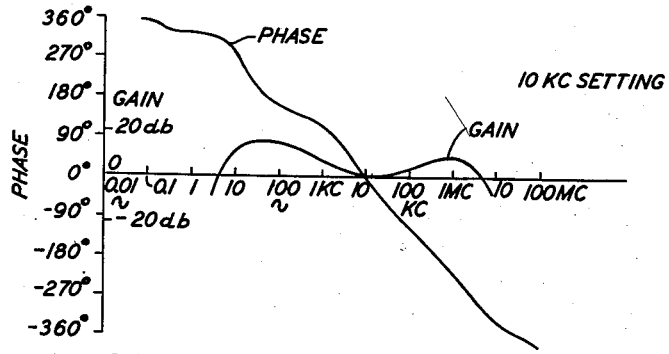
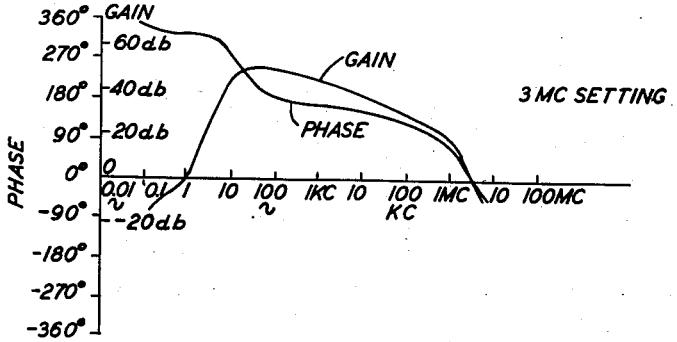
INVENTOR
F. B. ANDERSON
BY W. J. O'Neill
ATTORNEY March 31, 1953     F. B. ANDERSON     2,633,534
VARIABLE FREQUENCY OSCILLATOR Filed Feb. 1, 1950     18 Sheets-Sheet 15

INVENTOR
F. B. ANDERSON
BY W. J. O'Neill
ATTORNEY

March 31, 1953  F. B. ANDERSON  2,633,534
VARIABLE FREQUENCY OSCILLATOR
Filed Feb. 1, 1950  18 Sheets-Sheet 16

INVENTOR
F. B. ANDERSON
BY W. J. O'Neill
ATTORNEY

March 31, 1953 F. B. ANDERSON 2,633,534
VARIABLE FREQUENCY OSCILLATOR
Filed Feb. 1, 1950 18 Sheets-Sheet 17

INVENTOR
F. B. ANDERSON
BY
W. J. O'Neill
ATTORNEY

March 31, 1953  F. B. ANDERSON  2,633,534
VARIABLE FREQUENCY OSCILLATOR
Filed Feb. 1, 1950  18 Sheets-Sheet 18

INVENTOR
F. B. ANDERSON
BY W. J. O'Neill
ATTORNEY

Patented Mar. 31, 1953

2,633,534

UNITED STATES PATENT OFFICE 2,633,534

VARIABLE FREQUENCY OSCILLATOR

Frithiof B. Anderson, Fanwood, N. J., assignor to Bell Telephone Laboratories, Incorporated, New York, N. Y., a corporation of New York Application February 1, 1950, Serial No. 141,621

11 Claims. (Cl. 250—36)

This invention relates to oscillation producing apparatus, and particularly to variable or adjustable frequency bridge-type oscillation generators which may be adjusted over a wide or very wide range of frequency values with relatively simple forms of frequency control, and which may be utilized, for example, in gain and phase measuring systems, in frequency modulating systems and in other variable frequency oscillation systems, and also in tunable amplifiers, as in amplifiers for detectors, for example.

One of the objects of this invention is to provide oscillation producing apparatus which may be operated over a wide or an extremely wide range of frequency values that, in extreme cases, may be a frequency band ratio up to one billion to one, or more.

Another object of this invention is to provide variable frequency oscillation producing apparatus which may be continuously adjusted in frequency to any value within or over a wide range of frequency values, in one sweep of a single or other relatively simple form of frequency control means.

Another object of this invention is to provide considerable simplification in the control and other circuit components of wide-range variable frequency oscillation producing apparatus.

Another object of this invention is to provide oscillation producing apparatus which may have a plurality of output circuits available in a plurality of different phases.

Another object of this invention is to improve the frequency stability and the amplitude stability of variable frequency oscillation producing apparatus.

It is often desirable to be able to realize in practical oscillators a continuous frequency sweep over a wide or very wide range of frequency values. In simple forms of oscillators of known prior art types, the frequency band continuously tunable over any one range is usually quite limited to a comparatively narrow range of frequency values. Thus, in known oscillators of the type having a simple tuning circuit utilizing a fixed inductance element and one or more variable capacitance elements, frequency bands of the order of about 3 to 1 are available when utilizing a capacitance variation of the order of about 9 to 1 in the capacitance tuning element thereof; and somewhat wider frequency ranges are available in known oscillators of that type when utilizing therein a variable inductor type of tuning adjustment. Still wider frequency bands, up to the order of perhaps 1000 to 1, are available in known oscillators utilizing variations in the variable resistance and variable capacitance tuning elements employed as components in Wien type bridges and other known types of bridge configurations. Also, while very much wider frequency bands of the order of up to around 1,000,000 to 1, or more, are available in known types of heterodyne oscillators, these are subject to certain disadvantages in that the output frequency at the low frequency end of the frequency range thereof particularly, depending as it does on a relatively small frequency difference between two relatively large frequency quantities, often results in comparatively poor frequency stability. Moreover, elaborate precautions are often required in order to prevent the two beating oscillators thereof from locking into frequency step, and also additional measures are often required to suppress undesired spurious or image responses that tend to occur in known types of the heterodyne oscillator.

In accordance with this invention, a variable frequency oscillation generator of the bridge type may be provided which may be operated over a wide or very wide range of variable frequency values comparable with, and even wider than, that obtainable in practice from the known heterodyne types of oscillator, but which at the same time avoids certain disadvantages peculiar to the heterodyne type of oscillator, and which results in improved performance and also considerable simplification in construction.

The variable frequency oscillation generator provided in accordance with this invention may comprise a feedback transmission loop circuit which may include therein either a single frequency-determining bridge, or two such frequency-determining bridges, provided with suitable associated sources of gain and connected in tandem circuit relation in the transmission loop circuit. With the use of two of such bridges in the circuit, a considerable amount of widening in the range of sweep frequency values may be obtained. The sources of gain that are associated with the bridge or bridges may comprise conventional vacuum type amplifier tubes, or other suitable sources of gain, which are capable of providing a suitable amount of gain in the transmission loop circuit. In a given circuit, the range of frequency values obtainable may be somewhat limited by the amount of gain available in the circuit.

In accordance with this invention, the feedback transmission loop may include one or two adjustable type bridges therein, and each of the bridges may exhibit control not only of the range of variable frequency values obtainable, but also of the selection of any one of the adjustable frequency values available within the range of variable frequency values. Also, the bridges, due to their transmission characteristics, may exhibit a certain amount of amplitude control of the variable frequency oscillations in the circuit by maintaining a substantially or roughly constant or other desired transmission voltage ratio through the bridges and the remainder of the transmission loop, at all of such adjustable frequency value settings within the range of the available variable frequency values.

Also, in accordance with this invention, each of the adjustable bridges provided in the transmission loop circuit may have an output-to-input transmission or voltage ratio which, over the zero to infinity frequency band, is characterized by a phase shift varying substantially from 0 to 180 degrees, namely, from 0 to 180 degrees in the first bridge, and from 180 to 0 degrees in the second bridge when used, so that in combination with incidental or other phase shifts contributed in other parts of the feedback transmission loop circuit, a resultant net phase shift of zero degree may be realized around the loop circuit with a gain of unity or more at any one of the oscillation frequency values within the range of variable frequency values provided by the bridges. The frequency of oscillation within the range of available frequency values, occurs at a substantially 90-degree phase shift position in one bridge, and at a substantially 270-degree phase shift position in the other bridge. If one bridge only is used, the remainder of the transmission loop furnishes the required phase shift. The contributions of the transmission loop, especially near the ends of the variable frequency range, will tend to shift the bridge phase shift contribution away from the 90-degree or 270-degree positions. Both bridges may furnish phase shifts of 0 degree to 180 degrees or 180 degrees to 0 degree, or one alone may, and the required additional phase shift may be made up in the remainder of the transmission loop.

The bridge phase shifts may be adjusted over a wide range of frequency values by adjustment separately or simultaneously of the impedance value of one or more of the arms of either or of both of the bridges, as by means of a potentiometer arrangement, a signal responsive variable impedance electronic tube device, or by other suitable variable impedance means disposed on one or more arms of the bridge or bridges.

In a particular embodiment, the feedback transmission loop circuit may include therein two essentially similar frequency-determining bridge circuits or bridges, and suitable associated amplifier type pentodes or other vacuum tube electronic space discharge devices acting as sources of gain. Each of the bridges may include in one or more of the arms thereof a two-terminal type network, and such networks disposed in the bridge arms may have reactance characteristics that correspond to the range of the variable oscillation frequency values desired and that also may be capable of maintaining the amplitude level of such oscillations at a roughly constant or other predetermined value over the range of such variable oscillation frequency values, and that will provide a phase shift substantially of 180 degrees for each of the two bridges. The reactance networks referred to may be included in either a single series arm or in a single shunt arm, or may be included in two adjacent arms comprising a series and a shunt arm of each of the two bridges.

In a more particular embodiment, the reactance networks may be two quite similar networks comprising one series arm of each of the two bridges, and the remaining three arms of each of the two bridges may comprise resistance or other type impedance arms. One or more of the bridge arms, such as the resistance arms thereof, may be varied in impedance value or in impedance ratio by any suitable frequency control means such as by a potentiometer arrangement to thereby adjust the value of the variable oscillation frequency values to any one of the such values within the range of frequency values provided by the reactance characteristics of the networks of the two bridges.

The reactance networks provided in the bridge arms may each comprise any suitable series and parallel combinations of impedance elements such as resistance and reactance elements of values suitable for covering the range of variable frequency values desired to be covered and utilized. The reactance elements of the networks may comprise capacitance type elements or inductance type elements or both, and may be of the lumped reactance type for use in the low and intermediate frequency ranges, or of the known tuned or resonant coaxial or other transmission line type for use in the higher frequency ranges.

In a particular embodiment, the reactance networks utilized in the bridge arms may comprise a plurality of series-connected sections of reactance and resistance elements, the reactance elements of the sections being capacitance or inductance elements, and the number of series-connected sections being in accordance with the range desired for the range of the variable frequency values in the particular circuit. Bridges employing such network combinations of reactance and resistance elements may be designed to provide a roughly constant or other predetermined transmission of energy at all of the desired frequency settings over a wide range of frequency adjustment, which may be in extreme cases up to the order of a frequency band ratio of 1,000,000,000 to 1, or more.

In a more particular embodiment, the networks utilized in the bridge arms may comprise, as an illustrative example, a plurality of series-connected sections of parallel-connected resistance and capacitance elements, the number of such sections being two or more, as from two to ten or more such series-connected sections, according to the extent of the range of variable frequency values desired for the particular circuit, it being understood that as the number of such series-connected RC sections is increased, the range or number of octaves or decades of frequency values covered by the network is increased. Two similar bridges employing such RC networks utilizing such combinations of capacitance and resistance elements, may be readily designed to provide ranges of variable frequency values of the order of 100,000 to 1, and ranges up to 1,000,000,000, or more, to 1 may be realized, in extreme cases, by increasing the number of the reactance-resistance sections of the networks utilized in the two bridges. In the latter case, the range of variable frequency values might be, for example, values varying roughly from 0.01 cycle per second to 10 megacycles per second.

The frequency control or adjustment may be made by changing the impedance ratio of two adjacent arms of one bridge or of both of the bridges. In a particular embodiment, the frequency control means for selectively varying the frequency over the range of available variable frequency values may comprise a resistance type of potentiometer arrangement in which two adjacent resistance arms of each of the two bridges may form a separate resistance type potentiometer for each of the two bridges. To vary the frequency of oscillation, the two potentiometers may be adjusted separately, or simultaneously by suitable ganged control means, in order to thereby vary the relative impedance values of the two adjacent arms of each bridge that form the two respective potentiometers. The two potentiometers may be gang controlled potentiometers, and the frequency of oscillation may be continuously adjusted over the entire range of variable frequency values available to the circuit, in one sweep of the two-gang potentiometer control means. The potentiometer control means may have dial divisions that are approximately linear in character, the frequency of oscillation being an approximately logarithmic function of the linear potentiometer dial setting.

In accordance with this invention any one or more of four available outputs may be provided which are spaced apart at nominally 90-degree or in quadrature phase positions, namely at about 0, 90, 180 and 270 degrees phase positions associated with the gain-feedback or $\mu\beta$ loop circuit of the oscillator, a feature which is useful for many applications such as for quadrature modulators for single sideband carrier systems, for phase shifting of outputs by combining of the components in quadrature, and for use in gain and phase measuring systems, for example.

It will be noted that the present invention may be utilized to eliminate the necessity of providing switch arrangements in order to cover the entire range of frequency values, and also may provide a frequency stability that is not often approached by a heterodyne type of oscillator, particularly at very low frequencies. Moreover, the oscillator in accordance with this invention may be characterized by an almost constant or other predetermined feedback at frequency settings over the range of variable frequency values, so that the amplitude limiting device, which may be a temperature or voltage variable resistance device such as a thermistor or a varistor, is called upon to provide only a comparatively small adjustment in loop transmission to limit the amplitude of oscillations. Also, single frequencies may be selected from the range of variable frequency values without spurious or image responses to other frequencies, and the range of variable frequency values may cover many decades without resorting to the usual heterodyne method of selection of frequency or to frequency selective or frequency band selective switches.

By the application of less feedback transmission than is usually employed in an oscillator, the invention may be used as a tunable amplifier for use in detector and other systems.

For a clearer understanding of the nature of this invention and the additional advantages, features and objects thereof, reference is made to the following description taken in connection with the accompanying drawing, in which like reference characters represent like or similar parts and in which:

Fig. 1 is a circuit diagram illustrating in simplified or basic form a wide-range variable frequency oscillator in accordance with this invention;

Figs. 1A to 1E are diagrams illustrating various examples of modifications in networks which may be utilized as alternative networks in the arms of the bridge circuits shown in Figs. 1, 2, and in other figures;

Figs. 4 to 28 are diagrams and graphs illustrating the theory, design and operation of the network, the bridge, and the transmission loop characteristics for circuits as illustrated in Figs. 1 and 2;

Figure 2:
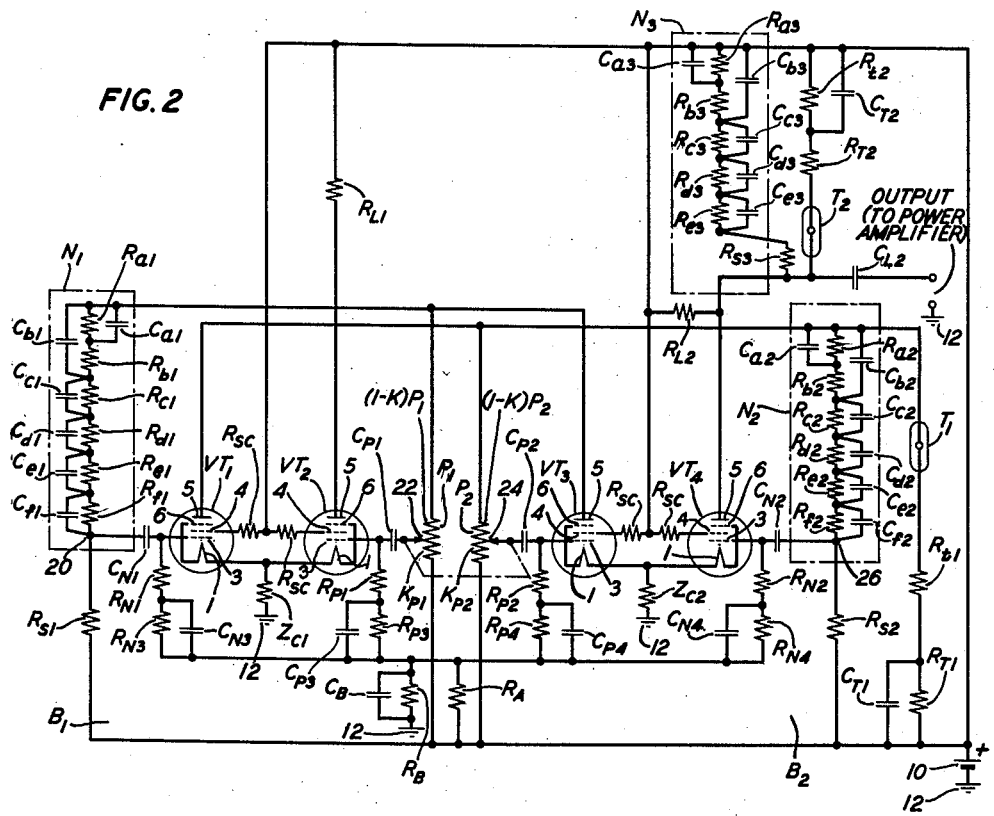
Fig. 2 is a circuit diagram, similar in part to that shown in Fig. 1, but illustrating in more detail an example of a particular variable frequency oscillator which may have an operating frequency range varying roughly from 20 to 3,000,000 cycles per second, for example.
Figure 7A:
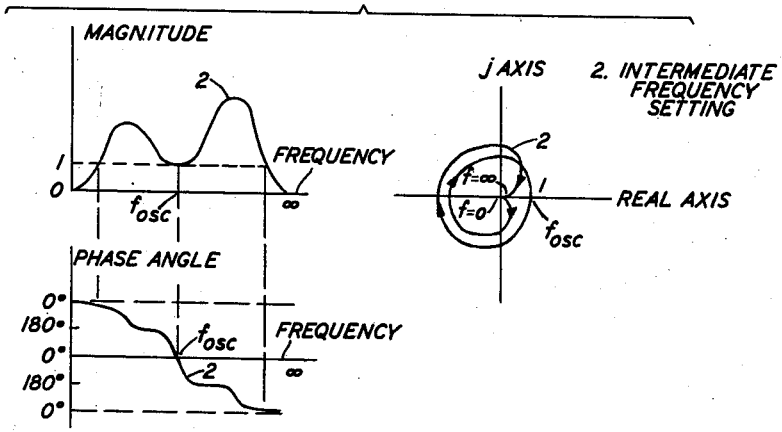
Figure 7B:
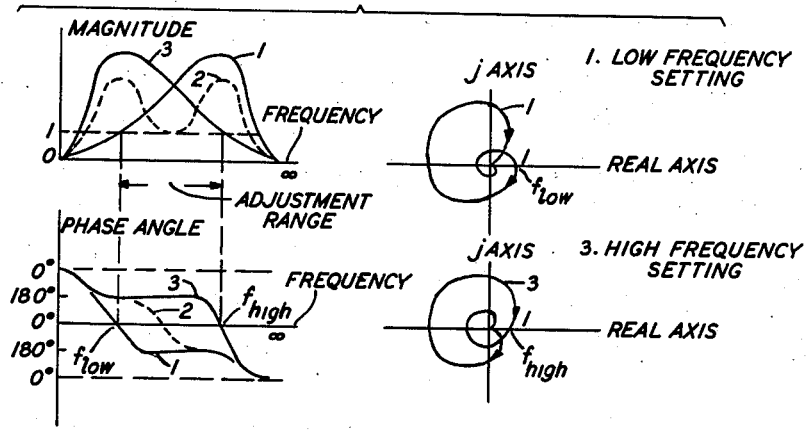
Figure 8A:
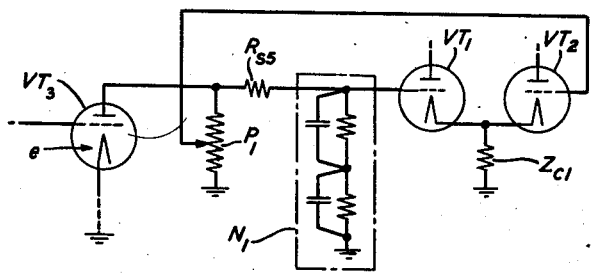
Figure 8B:
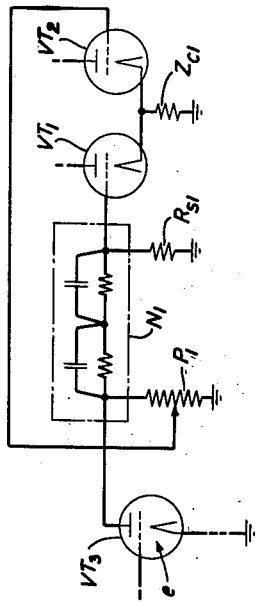
Figure 9:
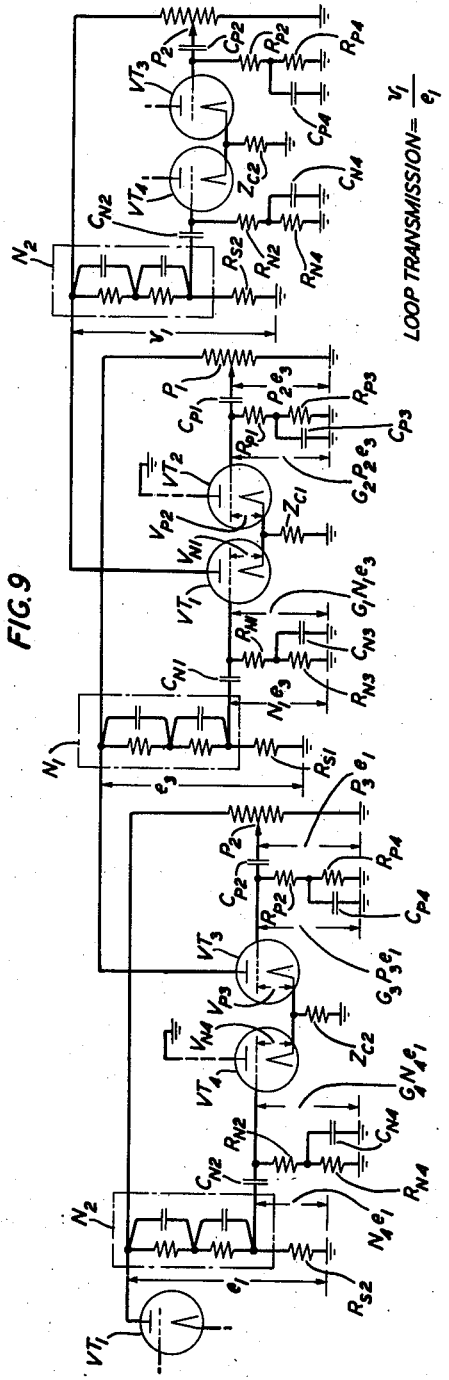
Figure 14A:
Figure 14B:
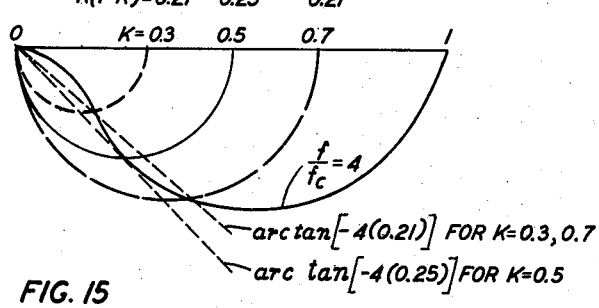
Figure 15:
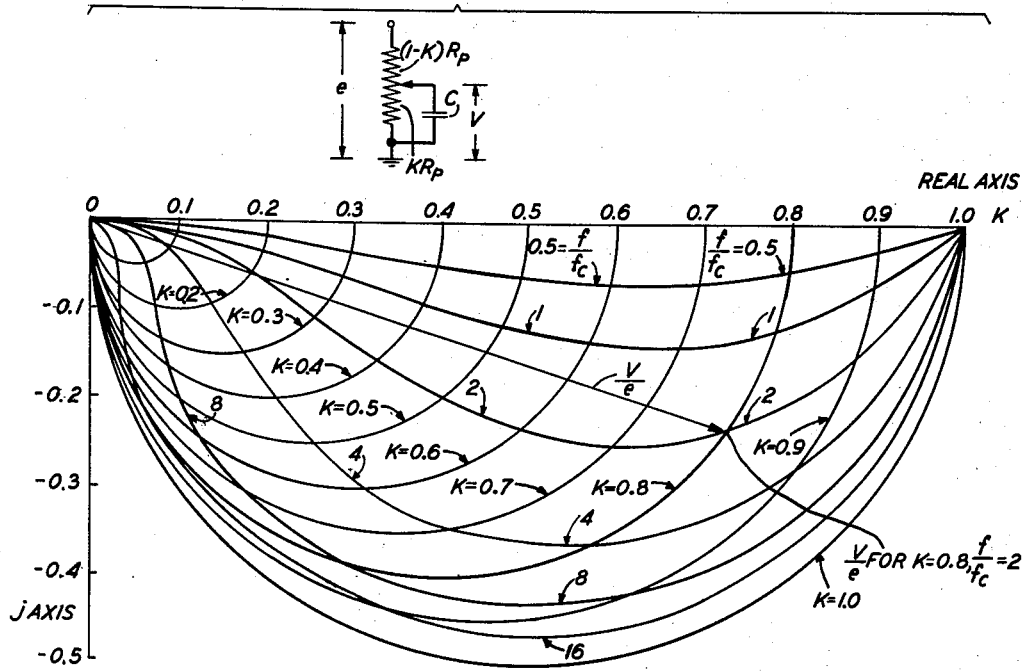
Figure 19A:
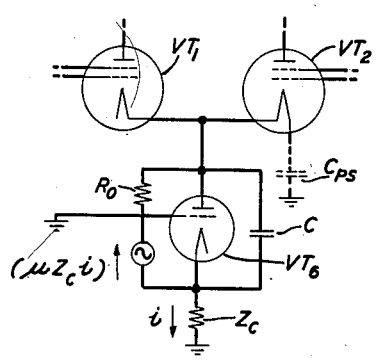
Figure 19B:
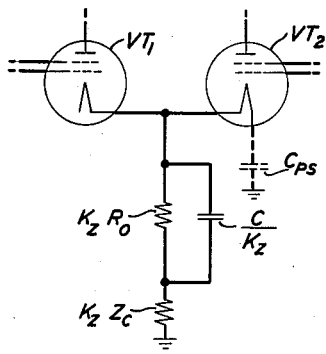
Figure 24A:
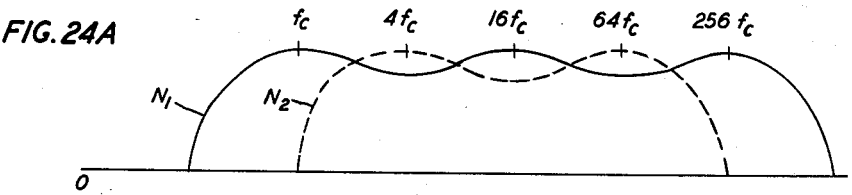
Figure 24B:
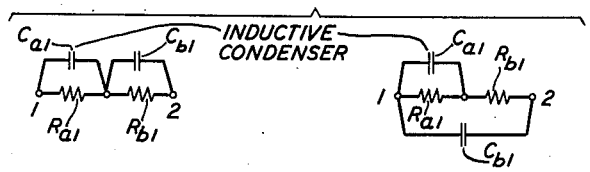
Figure 24C:
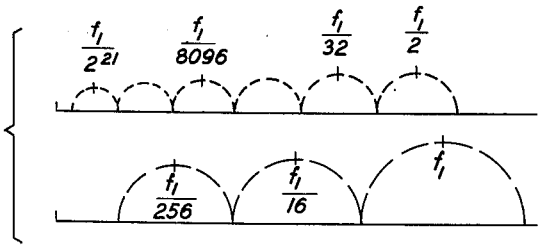
Figure 24D:
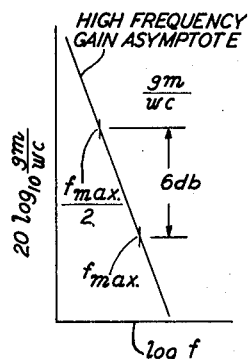
Figure 25:
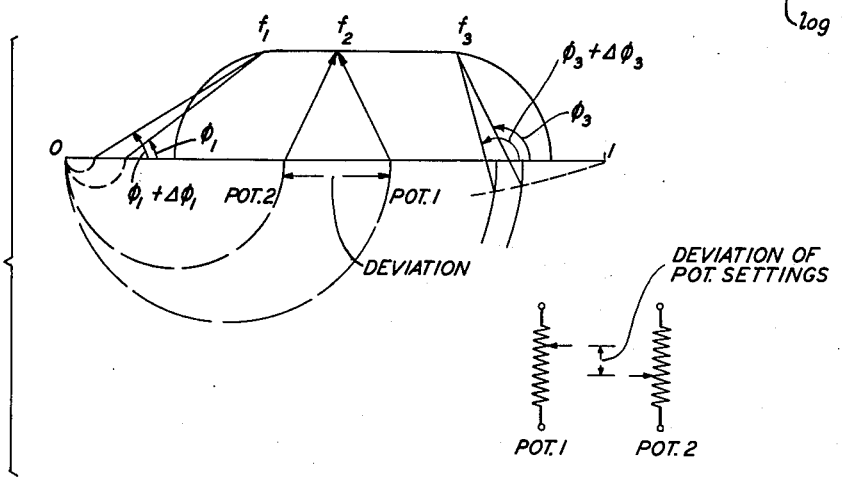
Figure 26A:
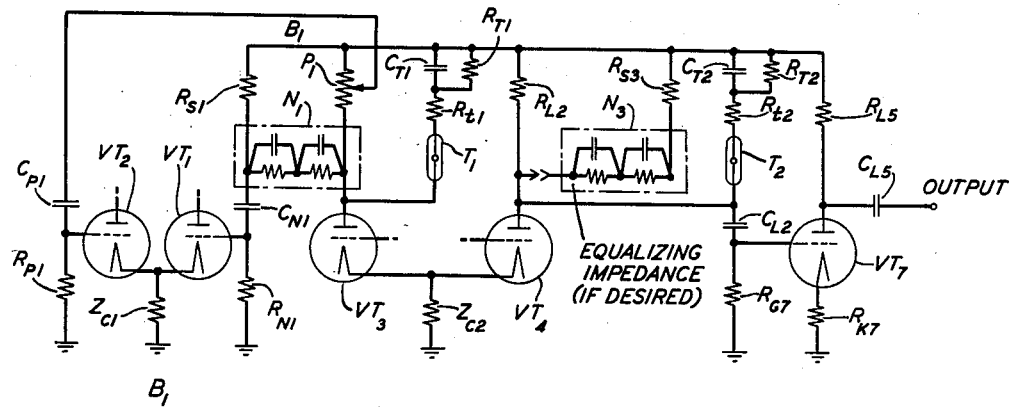
Figure 26B:
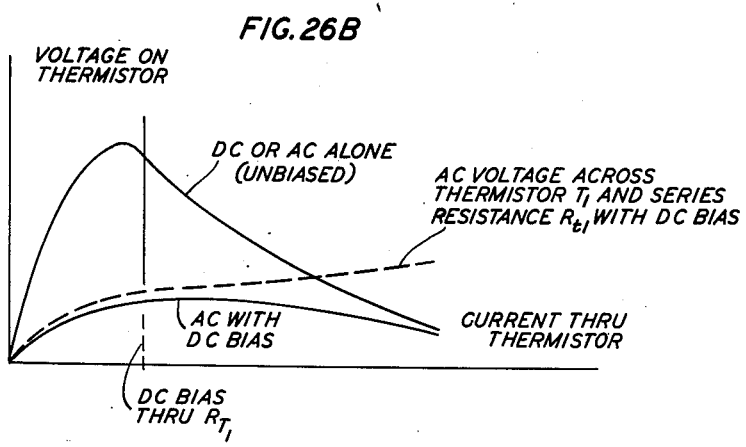
Figure 27:
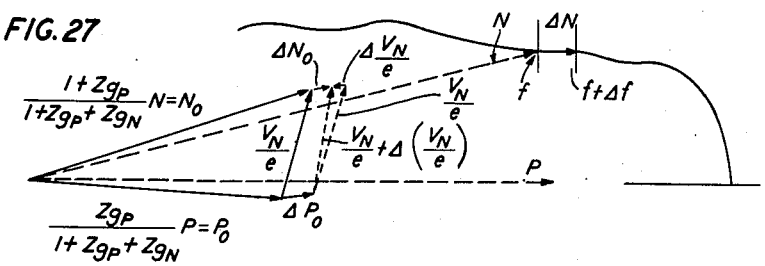
Figure 28:
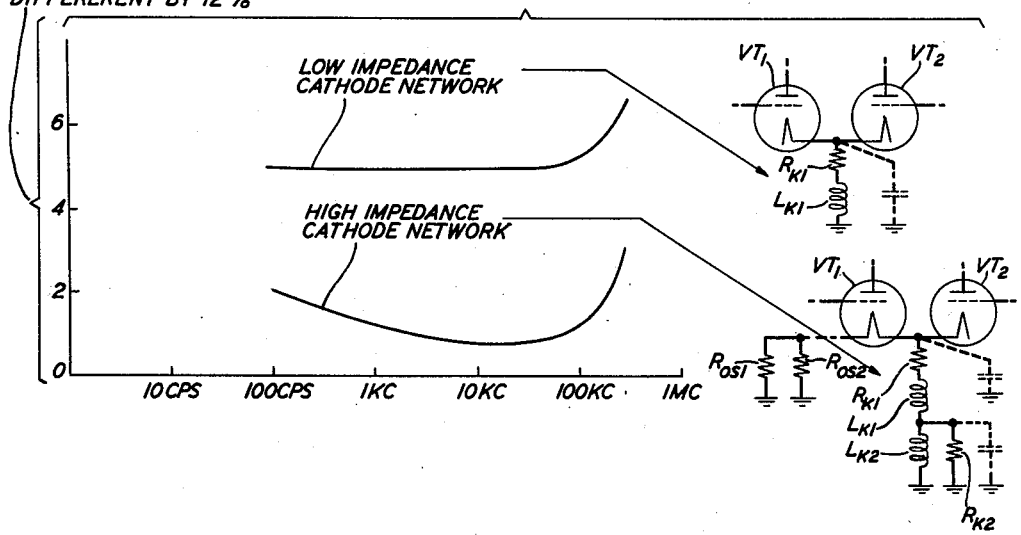
Figure 29A:
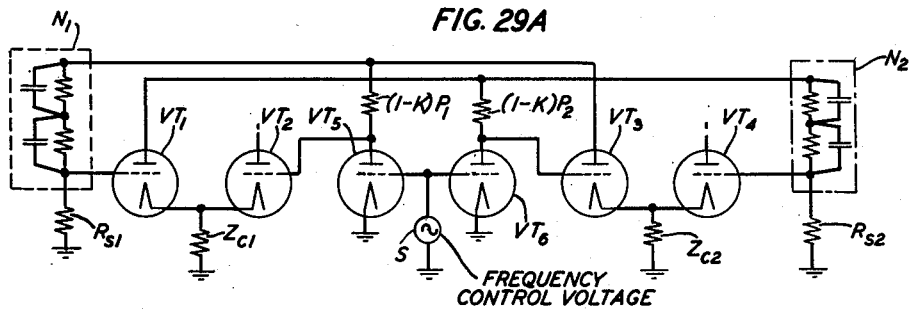
Figure 29B:
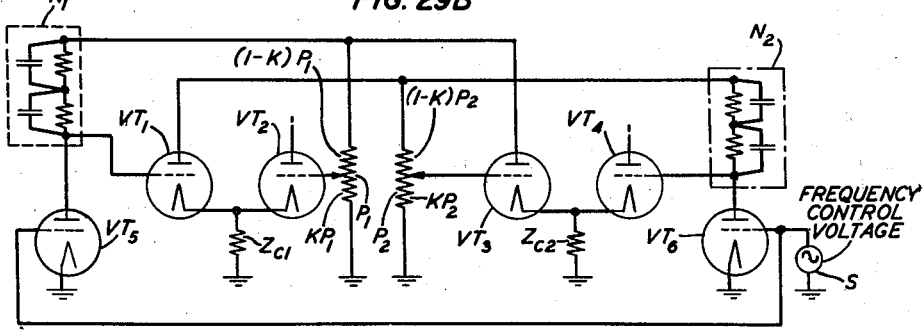
Figure 30:
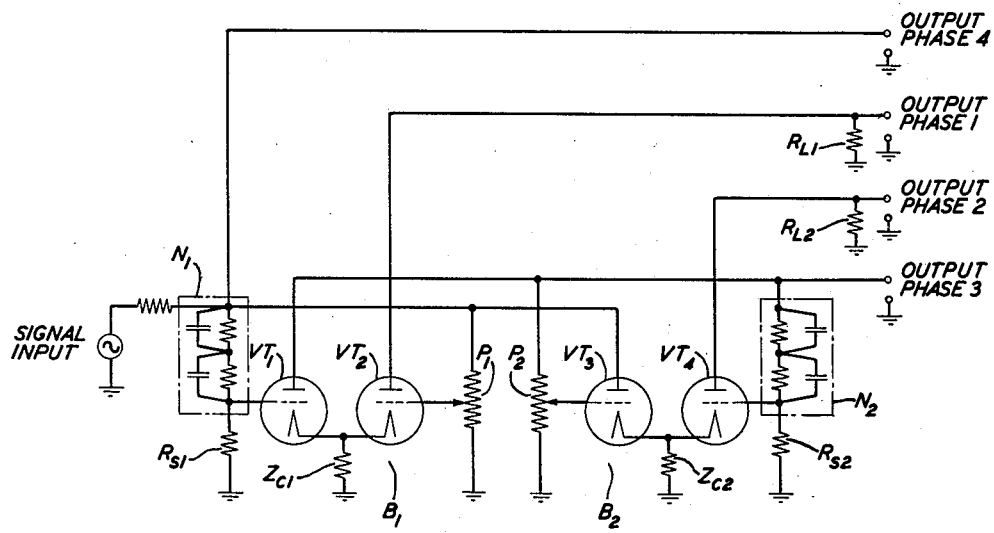
Figure 31:
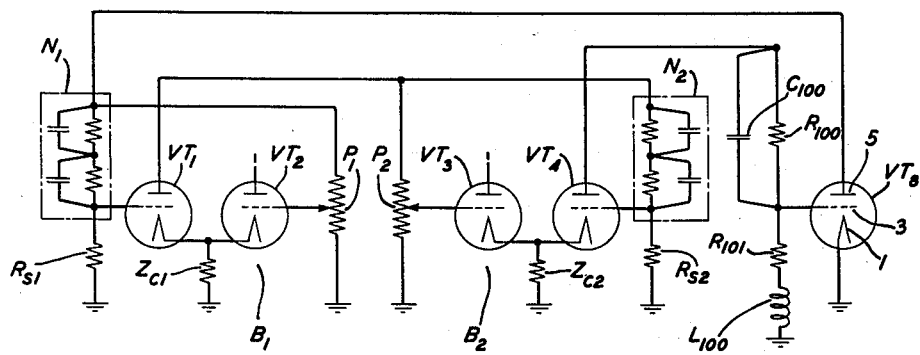

Figs. 4A, 4B and 4C illustrating the two-terminal impedance characteristics of resistance-capacitance (RC) network combinations;

Figs. 5A and 5B illustrating the output voltage characteristics from an adjustable bridge;

Figs. 6A, 6B and 6C illustrating an idealized oscillator circuit using other arrangements of RC networks in bridges, and an idealized transmission characteristic;

Figs. 7A and 7B illustrating transmission characteristics around an oscillator feedback loop;

Figs. 8A and 8B illustrating respectively, types of oscillator bridges provided with an RC network in the shunt arm, and an RC network in the series arm of the bridge;

Fig. 9 illustrating the oscillator of Fig. 2 in opened-out form for loop circuit transmission analysis;

Figs. 10A, 10B, 10C, 10D and 10E illustrating the transmission of energy to a resistance through an RC network;

Fig. 11 illustrating the relations between the transmission and the elements of an RC network;

Figs. 12A and 12B illustrating the effect of shunt capacitance upon the RC network transmission;

Figs. 13A, 13B and 13C illustrating the method of approximating the required transmission characteristic of an RC network;

Figs. 14A and 14B illustrating the transmission through a capacitance bridged resistance potentiometer;

Fig. 15 illustrating a voltage ratio diagram $$\frac{v}{e}$$

for a resistance potentiometer with capacitance between the slider and ground;

Figs. 16A, 16B and 16C illustrating the bridge output voltage (Ne—Pe) variation with frequency;

Fig. 17A illustrating the input voltages to the amplifier tubes; and Figs. 17B and 17C the influence of the screen electrode upon the cathode feedback impedance Z or $Z_c$;

Figs. 18A and 18B illustrating the cathode impedance effects;

Figs. 19A and 19B illustrating the equivalent circuit of a triode as a cathode impedance with local feedback;

Figs. 20A, 20B, 20C and 20D illustrating the plate-grid coupling network factor G;

Fig. 21 illustrating the magnitude and phase angle of two-terminal impedances and of transmission ratios represented by equations of bilinear form;

Fig. 22 illustrating the plate load impedance neglecting parasitic capacitance and plate-grid coupling networks;

Figs. 23A, 23B and 23C illustrating the transmission loop gain and phase characteristics for settings respectively of 20 cycles, 10 kilocycles, and 3 megacycles per second;

Fig. 24A illustrating the effect of staggering the RC network frequencies to smooth the loop transmission ripples, Fig. 24B illustrating rearrangement of an RC arm to isolate an inductive condenser at high frequencies, and Figs. 24C and 24D illustrating oscillator frequency range variation with topmost frequency;

Fig. 25 illustrating effects of misalignment of the frequency adjusting potentiometers;

Figs. 26A and 26B illustrating thermistor type output regulator circuits and effects;

Figs. 27 and 28 illustrating frequency stability characteristics with gain variation;

Fig. 29A and 29B are circuit diagrams illustrating modifications which may be made in the bridge circuits of Figs. 1 or 2, in order to provide for frequency modulation thereof from a modulating or signal responsive variable impedance source;

Fig. 30 is a circuit diagram illustrating a variable frequency tuned amplifier having outputs in quadrature;

Figure 31 is a circuit diagram illustrating an added electronic tube placed in the feedback loop and which may be utilized in place of the phase turn-over provided in the bridge connections shown in Figs. 1, 2, 29A, 29B and 30; and Fig. 32 is a circuit diagram illustrating a single bridge form of variable frequency oscillator.

Referring to the drawing, Fig. 1 is a circuit diagram illustrating, in somewhat simplified or basic form, a bridge-type variable frequency oscillation generator which is capable of continuous frequency adjustment to individual frequency values over a wide or very wide range of frequency values, by means of a simple form of frequency control which, as illustrated in Fig. 1, may be a gang controlled potentiometer arrangement comprising a resistance potentiometer P1 associated with two other arms N1 and $R_{S1}$ of a four-arm first bridge B1 and a resistance potentiometer P2 associated with the two arms N2 and $R_{S2}$ of a four-arm second bridge B2.

As shown in Fig. 1, the oscillator circuit may comprise two substantially similar frequency-determining bridge circuits or bridges B1 and B2 respectively including in arms thereof suitable frequency range controlling networks N1 and N2 respectively, and also suitable associated sources of high gain VT1, VT2, VT3 and VT4 which may comprise amplifier type electronic vacuum tubes in the form of conventional triodes or pentodes for example, having cathodes 1, suitable heaters (not shown) for the cathodes 1, control grid or input electrodes 3, screen electrodes 4 and suppressor grids 6 when used as in Fig. 2, and anode or output plate electrodes 5.

A battery or other suitable power supply source of direct-current voltage 10 having its negative terminal connected to ground 12 and its positive terminal connected through plate resistors $R_{L1}$ and $R_{L2}$ and through other circuits as shown in Fig. 1, to the respective anodes 5 of the vacuum tubes VT1, VT2, VT3 and VT4, may supply suitable plate supply positive potentials thereto. The cathode electrodes 1 of the pair of vacuum tubes VT1 and VT2 associated with the first bridge B1, may be connected together and through a suitable common cathode resistance element $Z_{c1}$ may be connected to ground 12. Similarly, the cathodes 1 of the other pair of vacuum tubes VT3 and VT4 associated with the second bridge B2 may be connected together and through a suitable common cathode resistance element $Z_{c2}$ may also be connected to ground 12. Suitable grid resistors $R_{N1}$, $R_{P1}$, $R_{P2}$ and $R_{N2}$ may be utilized to connect to ground 12 the respective control grid electrodes 3 of each of the vacuum tubes VT1, VT2, VT3 and VT4.

Suitable condensers $C_{N1}$ and $C_{P1}$ may be utilized to connect the respective control grid or input electrodes 3 of each of the pair of tubes VT1 and VT2 respectively with opposite junction points 20 and 22 between arms of the associated first bridge B1, whereby the respective vacuum tubes VT1 and VT2 may be fed with energy received from the first bridge B1. Similarly, suitable condensers $C_{P2}$ and $C_{N2}$ may be utilized to connect the respective control grid electrodes 3 of each of the other pair of amplifier tubes VT3 and VT4 respectively with opposite junction points 24 and 26 between arms of the associated second bridge B2, whereby the pair of amplifier tubes VT3 and VT4 may be fed with energy received from the second bridge B2.

As shown in Fig. 1, each of the two bridges B1 and B2 may comprise two series arms and two shunt arms, and one of the series arms of each of the two bridges B1 and B2 may comprise similar networks N1 and N2 respectively, and the remaining three arms of each of the two bridges B1 and B2 may comprise resistance elements. Two adjacent resistance arms $(1-k)P_1$ and $kP_1$ of the first bridge B1 may comprise the frequency adjusting potentiometer P1 with the resistance part $(1-k)P_1$ thereof that is above the adjustable tap connection 22 constituting a series arm of the first bridge B1 and the resistance part $kP_1$ thereof that is below the tap connection 22 constituting a shunt arm of the first bridge B1. The remaining shunt arm of the bridge B1 may comprise a resistor $R_{S1}$. Similarly, two adjacent resistance arms $(1-k)P_2$ and $kP_2$ of the second bridge B2 may comprise the frequency adjusting potentiometer P2 with the resistance part $(1-k)P_2$ thereof that is above the adjustable tap connection 24 constituting a series arm of the second bridge B2 and the resistance part $kP_2$ thereof that is below the tap connection 24 constituting a shunt arm of the second bridge B2. The remaining shunt arm of the second bridge B2 may comprise a resistor $R_{S2}$.

As shown in Fig. 1, the two-terminal network N1 disposed in a series arm of the first bridge B1 and the two-terminal network N2 disposed in a series arm of the second bridge B2 may be similar networks, each comprising a plurality of series-connected sections of parallel-connected resistance and capacitance elements which in the network N1 are labeled $R_{a1}$, $C_{a1}$ and $R_{b1}$, $C_{b1}$, and which in the network N2 are labeled $R_{a2}$, $C_{a2}$ and $R_{b2}$, $C_{b2}$. Accordingly, the networks N1 and N2 may be similar networks each having an equal number of series-connected sections comprising reactance and resistance elements. In a very particular case employing constant current generators, the resistance elements of the series-connected sections of each of the networks N1 and N2 may have substantially equal resistance values, and the reactance elements of the series-connected sections of the networks N1 and N2 may be capacitance elements which may be set in geometric ratio whereby each successive capacitance element of each network N1 and N2 has a successively higher capacitance value which may be a constant factor times the next smaller capacitance value of the capacitance element in the next adjacent section in the same network N1 or N2.

In general, the networks N1 and N2 may have a roughly or sometimes a nearly constant reactance characteristic over the range of the frequency values provided by the networks N1 and N2 and thereby constitute means for providing a roughly constant loop circuit transmission of oscillations for the range of frequency values. For this purpose the reactance values of the networks N1 and N2 may be made roughly constant between the reactance peak frequencies of the sections thereof, and the total resistance of the sections of the networks N1 and N2 may have values changing nearly linearly with the logarithm of frequency between the frequency values of peak reactance of the individual sections of the networks N1 and N2.

The networks N1 and N2 function to determine the range of available variable frequency values which may be produced in the circuit, and that range of such variable frequency values may be made wider by the number and arrangement of the sections and combinations of component network elements forming the networks N1 and N2. The networks N1 and N2 also may function with other parts of the circuit to maintain the amplitude of oscillations through the bridges B1 and B2 at a roughly constant or other predetermined value over the range of variable frequency values provided by the bridges B1 and B2. The potentiometers P1 and P2, by adjustment of either or both the tap connections 22 and 24 thereof, may function to continuously adjust the frequency of oscillation to any one of the variable frequency values provided by the bridges B1 and B2. Each of the bridges B1 and B2 also functions to produce a phase shift therein from 0 to 180 degrees over the zero to infinity frequency band, so that with incidental phase shifts contributed by other components in the feedback transmission loop circuit, a net resultant zero phase shift around the transmission loop circuit may be provided at a gain of unity or more at the frequency of oscillation.

As shown in Fig. 1, the feedback transmission loop circuit may be traced, beginning for example, with the anode 5 of the tube VT1. From the output or anode electrode 5 of the tube VT1 associated with the first bridge B1, energy is fed to the other bridge B2 and to the input electrode 3 of the tube VT3 associated with the bridge B2, then from the output electrode 5 of that tube VT3 back to the first bridge B1 and to the input electrode 3 of the tube VT1, and then to the output electrode 5 of that tube VT1, thus completing the closed transmission path of the loop circuit of the oscillator shown in Fig. 1. It will be noted that the output from the anode electrode 5 of the tube VT1 of the first bridge B1 is connected to the bridge B2. One part of the output passes through part of the resistance of the potentiometer P2 and through the condenser $C_{P2}$ to the control grid electrode 3 of the tube VT3 of the second bridge B2. The other part of the output from the tube VT1 passes through the network N2 and the condenser $C_{N2}$ to the control grid electrode 3 of the tube VT4 of the second bridge B2. The space currents of the tubes VT3 and VT4 are combined in the common cathode return resistance $Z_{c2}$. The output currents of both tubes VT3 and VT4 are thus controlled by the voltages on the control grid electrodes 3 of both tubes. The output current of the tube VT3 is passed into the bridge B1. The transmission through the bridge B1 to the anode electrode 5 of the tube VT1 is similar to that just described for the bridge B2 to the anode electrode 5 of the tube VT3. Thus the output of the first bridge system B1 is connected with the input of the second bridge system B2, and the output of the second bridge B2 is connected to the input of the first bridge B1, the first and second bridge systems B1 and B2 being thereby connected in tandem circuit relation in the oscillator transmission loop circuit. The components connected in the loop circuit provide the net zero phase shift around the oscillator loop circuit at the frequency of oscillation.

Figure 3:
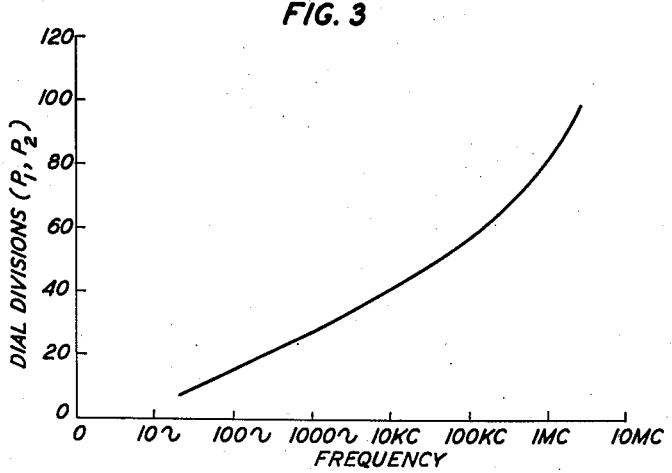
Fig. 3 is a graph illustrating an example of the dial frequency calibration for the ganged potentiometer frequency control means of the oscillator shown in Fig. 2.

As illustrated in Fig. 1, a single control means comprising the gang controlled potentiometers P1 and P2 may be provided for varying the relative impedance of two of the associated resistance arms of each of the bridges B1 and B2 for thereby varying the frequency of oscillations over the range of frequency values provided by the two bridges B1 and B2. The gang controlled potentiometers P1 and P2 may have substantially linear dial divisions corresponding substantially logarithmically with the variable frequency values of the circuit, as illustrated in Fig. 3.

Amplitude control means may be provided in the form of voltage or current variable resistance devices such as thermistors $T_1$ and $T_2$ for regulating the amplitude level of oscillations at all frequency settings over the range of variable frequency values provided by the two bridge circuits B1 and B2. Since the circuit itself, provided by the bridges B1 and B2 in accordance with this invention, may have a roughly constant level of feedback loop circuit transmission at all frequency settings over the range of variable frequency values provided by the circuit, the thermistors $T_1$ and $T_2$ may be called upon to provide only a relatively small adjustment in the amplitude of oscillations.

As shown in Fig. 1, output oscillations may be taken off one or more output circuits connected, through suitable coupling condensers $C_{L1}$, $C_{L2}$, $C_{L3}$ and $C_{L4}$, from the respective output or anode electrodes 5 of the four amplifier tubes VT1, VT2, VT3 and VT4, thus providing outputs in substantially quadrature phase relation from the amplifier tubes VT1 and VT2 relative to those from tubes VT3 and VT4, or outputs in opposed phase relation from amplifier tubes VT1 and VT2 or VT3 and VT4.

While the networks N1 and N2 of Fig. 1 are shown therein and also described as comprising particular forms of networks, it will be understood that any suitable form of networks N1 and N2 may be utilized, particular examples of which are illustrated and described in connection with Figs. 1A to 1E.

Figs. 1A to 1E are diagrams illustrating various types of networks N1 and N2 which may be utilized as alternative two-terminal networks N1 and N2 in the arms of the bridges B1 and B2 shown in Figs. 1, 2 and other figures. As shown in Fig. 1A, the two-terminal networks N1 and N2 may comprise a particular configuration of resistances $R_a$, $R_b$, etc., and condensers $C_a$, $C_b$, etc., and Fig. 1B shows another configuration of series and parallel combinations of resistances and condensers, and Figs. 1C, 1D and 1E show configurations using series and parallel combinations of resistances and inductance coils. Other configurations (not shown) using resistances, condensers and inductances may be utilized.

It is possible, although not necessarily desirable, to interchange the arms of the bridge. For instance in the bridge B1 of Fig. 1, the arms N1 and RS1 may be interchanged. Many other ways of rearranging the bridge arms are also possible. The adjustable potentiometer $P_1$ or $P_2$ may be replaced with a fixed resistance and a single variable resistance. Again, the resistance potentiometer $P_1$ or $P_2$ may be replaced with a capacity potentiometer in some cases. The resistance arm RS1 of Fig. 1 may be composed of a network, such as that shown in Fig. 1D, to complement the network N1 of Fig. 1. The networks N1 and N2 need not be identical, and may be varied to advantage as will appear hereinafter. Other variations will readily occur to one skilled in the art.

Fig. 2 is a circuit diagram, similar in part to that shown in Fig. 1, but illustrating in more detail an example of a particular variable frequency oscillator which may have, as an illustrative example, an operating frequency range varying roughly from 20 to 3,000,000 cycles per second, as illustrated by the curve in Fig. 3.

Referring to Fig. 3, a graph is shown which illustrates an example of the dial frequency calibration of the ganged potentiometer frequency control means P1 and P2 of the oscillator illustrated in Fig. 2 as provided with a variable frequency range extending roughly from about 20 cycles to 3 megacycles per second, as indicated by the abscissae plotted in logarithmic scale in Fig. 3. As shown in Fig. 3, the dial divisions are plotted in linear scale as ordinates, and the curve of Fig. 3 shows the relation between the dial divisions and the frequency values plotted in a curve which is nearly linear over at least a part of the variable frequency range.

Referring to Fig. 2, the oscillator circuit thereof is basically similar to that shown in Fig. 1, like reference characters representing like parts, but in the circuit of Fig. 2, additional components are included. The following additional resistance and capacitance components provided in the arms N1 and N2 of Fig. 2 serve to extend the frequency range over which the oscillator may be operated $R_{c1}$, $C_{c1}$, $R_{d1}$, $C_{d1}$, $R_{e1}$, $C_{e1}$, $R_{f1}$ and $C_{f1}$ in the network N1; and $R_{c2}$, $C_{c2}$, $R_{d2}$, $C_{d2}$, $R_{e2}$, $C_{e2}$, $R_{f2}$ and $C_{f2}$ in the network N2.

The resistances $R_{sc}$ provided in the battery leads to the screen electrodes 4 of the tubes VT1 to VT4 of Fig. 2 serve to inhibit spurious or parasitic oscillations in these tubes.

The resistance-capacity combinations $R_{N3}$ and $C_{N3}$, $R_{P3}$ and $C_{P3}$, $R_{P4}$ and $C_{P4}$, and $R_{N4}$ and $C_{N4}$ provided in the grid return leads of the tubes VT1 to VT4 of Fig. 2 supply a phase shift in the loop transmission at low frequencies which tends to prevent oscillation at low frequencies when the oscillator is adjusted to oscillate at a higher frequency.

Resistance and reactance components may be provided as follows in the arm N3, and in the elements bridged across this arm N3 in order to provide an output voltage with a reduced variation in amplitude over much of the frequency range of the oscillator: $R_{a3}$, $R_{b3}$, $R_{c3}$, $R_{d3}$, $R_{e3}$, $R_{s3}$, $C_{a3}$, $C_{b3}$, $C_{c3}$, $C_{d3}$, $C_{e3}$, $R_{T2}$, $R_{t2}$, $C_{T2}$, and thermistor $T_2$.

The resistances $R_A$ and $R_B$ serve as a potentiometer to supply a positive bias to the grid circuits of the tubes VT1 to VT4 inclusive in order to increase the currents drawn through these tubes and permit the use of large values of cathode resistance in $Z_{c1}$ and $Z_{c2}$. The grids are kept negative relative to their respective cathodes by proper proportioning of these resistances. The condenser $C_B$ by-passes the resistance $R_B$ in order to reduce unwanted coupling between the tubes.

While some components shown in Fig. 1 for multiple outputs have been omitted from Fig. 2, it will be understood that they may be similarly added to Fig. 2 which shows only one output for connecting to a power amplifier.

As an illustrative example for a particular variable frequency oscillator constructed in accordance with the circuit as illustrated in Fig. 2 and having a frequency range varying roughly from 20 cycles to 3 megacycles per second as illustrated in Fig. 3, the component elements of the circuit of Fig. 2 may be approximately as follows. The vacuum tubes VT1, VT2, VT3 and VT4 may be pentodes known as 6AK5 type, or other suitable sources of gain. The power supply source 10 may be a direct-current source of about 150 volts, or of other voltage suitable for the screen and anode electrodes 4 and 5 respectively of the vacuum tubes VT1, VT2, VT3 and VT4. The component resistance elements may each have resistance values approximately as follows as expressed in ohms, and the component capacitance elements may each have capacitance values approximately as follows expressed in micromicrofarads ($\mu\mu f.$):
$R_{a1}$, $R_{a2}$, $R_{a3}$=75,000; $R_{b1}$, $R_{b2}$, $R_{b3}$=15,000; $R_{c1}$, $R_{c2}$, $R_{c3}$=5,600; $R_{d1}$, $R_{d2}$, $R_{d3}$=3,000; $R_{e1}$, $R_{e2}$, $R_{e3}$=1,800; $R_{f1}$, $R_{f2}$=620; $R_{s1}$, $R_{s2}$=5,100; $R_{s3}$=5,600; $R_{N1}$, $R_{N2}$, $R_{N3}$, $R_{N4}$, $R_{P3}$, $R_{P4}$=1,000,000; $R_{P1}$, $R_{P2}$=1,000,000; $R_A$=75,000; $R_B$=27,000; $R_{sc}$=100; $Z_{c1}$, $Z_{c2}$=2,400; $R_{L1}$=4,700; $R_{L2}$=10,000; $P_1$, $P_2$=10,000; $R_{t1}$, $R_{t2}$=390,000; $R_{T1}$, $R_{T2}$=1,500; $T_1$, $T_2$=9,000,000 at 1 microampere, 2,000,000 at 10 microamperes, 120,000 at 100 microamperes, and 5,000 at 1 milliampere, all at 75° F.; $C_{a1}$, $C_{a2}$, $C_{a3}$=150,000; $C_{b1}$, $C_{b2}$, $C_{b3}$=30,000; $C_{c1}$, $C_{c2}$, $C_{c3}$=4,300; $C_{d1}$, $C_{d2}$, $C_{d3}$=470; $C_{e1}$, $C_{e2}$, $C_{e3}$=47; $C_{f1}$, $C_{f2}$=62; $C_{N1}$, $C_{N2}$=9,100; $C_{P1}$, $C_{P2}$=10,000; $C_{N3}$, $C_{N4}$, $C_{P3}$, $C_{P4}$=500,000; $C_B$=125,000,000; and $C_{T1}$, $C_{T2}$=2,000,000.

Network theory

As illustrated in Fig. 4A, the equivalent series resistance $R_s$ and reactance $X_s$ of a resistance R bridged at 1 and 2 with a condenser C are plotted for a frequency range from zero to infinity. The two-terminal impedance $Z_{12} = R_s + jX_s$ follows a semicircular locus, starting with a full diameter R at zero frequency, and winding up with a zero value at infinite frequency. The peak magnitude of the reactance $X_s$ is equal to one-half of the resistance R, and occurs at a frequency $f_c$, at which the reactance of the condenser C is equal in magnitude to the resistance R. The relations discussed above are summarized in Equation 1:

$$\frac{Z_{12}}{R} = \frac{1 - j\frac{f}{f_c}}{1 + \left(\frac{f}{f_c}\right)^2} = \frac{R_s}{R} + j\frac{X_s}{R} \quad (1)$$

where $$f_c = \frac{1}{2\pi CR} \text{ or } R = \frac{1}{2\pi f_c C}$$

Let us connect two such circuits in series, as illustrated in Fig. 4B, using two equal resistances $R_1$ and $R_2$ with capacities $C_1$ and $C_2$ in the ratio of about 16:1. The sum of the reactances of the two RC sections will be nearly constant between $f_{c1}$ and $f_{c2}=16f_{c1}$. The total resistance changes nearly linearly between $f_{c1}$ and $f_{c2}$ on a logarithmic frequency scale. The R—X plot of the two-terminal impedance approximates an envelope of the semicircles representing the individual RC sections laid side by side.

Several RC sections may be connected in series as illustrated in Fig. 4C. If the resistances are all equal, and the capacities are set in geometric ratio, each one sixteen times the next smaller one, a two-terminal impedance having almost constant reactance $X_{s12}$ over an extended frequency band may be built up. The resistive component $R_{e12}$ will be maximum at zero frequency, and will decrease sinuously and nearly linearly through uniformly spaced points on a log frequency scale, one point for each RC section, toward zero magnitude at infinite frequency. The R—X plot of the two-terminal impedance approximates an envelope of the semicircles representing the RC sections placed side by side.

If, as illustrated in Fig. 5A, a variable frequency constant current source $i$ is connected to the RC network of Fig. 4C, a voltage to be defined as $Ne$ will be developed across the network. The reactive component of $Ne$ will be nearly constant over a wide band of frequencies. The resistive component of $Ne$ will be proportional to the resistive component of the impedance. If a variable control, such as a resistance, or a potentiometer, is connected to a similar constant current source, synchronous and identical in phase with the first constant current source, a voltage to be defined as $e$ will be developed across it. The control can be adjusted to obtain a voltage $Pe$ equal to the resistive component of the voltage across the RC network. This adjustment will be different for every frequency. The potentiometer, the RC network and the constant current generator system may be considered a bridge, with output terminals at the potentiometer slider and the RC network input. For any setting of the potentiometer, a frequency of balance exists such that the output voltage $(Ne-Pe)$ will be only the reactive component of $Ne$. This voltage is in quadrature with $e$, and nearly constant over a wide range of potentiometer settings at the corresponding frequencies of balance.

As shown in Fig. 5B, the output $(Ne-Pe)$ will lag behind the constant current source by an angle increasing in a negative direction from 0 degree at zero frequency to $-180$ degrees at infinite frequency. For settings at very low frequencies, such as $f_1$, the magnitude of the output $(Ne-Pe)$ increases continuously with frequency from a small value at zero frequency to a maximum at infinite frequency. For settings at very high frequencies, such as $f_2$, the magnitude of $(Ne-Pe)$ decreases continuously from a maximum at zero frequency to zero at infinite frequency. For intermediate settings, such as for $f_{c2}$, the magnitude of $(Ne-Pe)$ increases from a minimum at or near the frequency of $-90$ degrees phase shift to larger values at zero and infinite frequency.

The bridge of Fig. 5A is endowed with properties useful in a tunable oscillator. Two bridges BI and B2 in tandem may be utilized as illustrated in Fig. 6A. The output of bridge BI drives the bridge B2 through the amplifier tube VTI. The output from the bridge B2 in turn drives the amplifier tube VT4. The output from the tube VT4 is amplified by the tube VT9 which drives the bridge BI. The tubes VTI, VT4 and VT9 furnish the gain required to overcome the losses in the transmission loop; they also provide a net 180 degrees phase turnover, which, added to the two 90-degree phase shifts through the bridges BI and B2, make a net 0-degree phase shift at the frequency of oscillation. The system will oscillate at the frequency of 0-degree phase shift in the loop transmission if just enough loop gain is available to supply the losses; the loop transmission ratio is then exactly unity. For transmissions less than unity with 0-degree phase shift, the system may be used as a selective amplifier. If the gain is increased above unity, the oscillation amplitude will increase until non-linearity reestablishes unity gain. The overloading necessary to reduce too high gain brings about a phase shift and harmonics, so that the oscillation frequency is shifted to reestablish a 0-degree phase shift around the loop and the wave form is distorted. If linear means are used to hold the gain close to unity, or 0 decibel, for a restrained oscillation amplitude, so that only a small non-linearity is involved to bring the gain to 0 decibel, improvement in frequency stability and wave form result.

To simulate constant current generators, the resistances $R_{s4}$ and $R_{s5}$ should be infinite. However, the bridge arms $R_{s5}$ and NI can be designed with resistances of reasonable size, and the resistances of NI will be not all equal, as for a constant current generator, but successively larger for lower frequency RC sections. The condensers will not be in successive 16 to 1 ratios either, and will require some readjustment to correspond. The effects of parasitic capacitances can also be tolerated to an extent if suitable adjustments of the values of $R_{s5}$ and NI are made. The arms $R_{s4}$ and N2 are treated likewise.

The procedure for design is much similar to that for preferred embodiment of the invention to be described in detail hereinafter. The oscillator loop design offers problems similar to those met in negative feedback amplifiers. In the case of the oscillator, one frequency of oscillation is required. The network design problem over the zero to infinity frequency range, except for this one frequency of oscillation, consists of avoiding any tendency to oscillate at another frequency. This means that if the oscillator loop transmission passes through a zero degree phase shift at any frequency except the desired frequency of oscillation, it must do so with a magnitude of less than unity, or zero decibel. Exceptions may be made for conditional stability as shown by Nyquist, although special measures may be necessary to establish oscillation in the desired mode. The Nyquist article referred to is contained in the Bell System Technical Journal for January 1932.

The design to be considered briefly will be limited to loop transmission magnitudes of less than unity at any zero degree phase shift point, except for the frequency of oscillation. The problem is simplified if zero degree is avoided altogether, except at this one frequency. The oscillator loop transmission of Fig. 6B is idealized. It includes the contributions of the two bridges, and assumes a perfect amplifier which is not physically realizable. Largely because of parasitic capacitances the amplifier gain will fall off at high frequencies; a negative phase shift results, depending on the rate of gain change with frequency. As shown in Fig. 6B, the two bridges B1 and B2 of Fig. 6A contribute a maximum high frequency phase shift of —180 degrees. The contribution of the amplifier at high frequency may be permissibly between 0 degree and —180 degrees without pushing the total loop phase shift through zero degree. The asymptotic slope of the amplifier gain then may be between 0 and —12 decibels per octave, see "Network Analysis and Feedback Amplifier Design" by H. W. Bode, published by D. Van Nostrand Company, 1945. The gain of the oscillator loop may be brought below unity at high frequency under such conditions as indicated in Fig. 7A.

Similar conditions hold for the low frequency end of the loop transmission. A phase shift range of 0 degree to 180 degrees is available, and an asymptotic slope of 0 to 12 decibels per octave may be used. The gain is brought below unity at low frequencies as indicated in Fig. 7A. Negative feedback at zero frequency could be realized with a direct current amplifier, if this is desirable, as it is not required that the gain be less than unity for low frequencies and direct current. Typical curves of transmission around the feedback loop of a practical adjustable oscillator are shown in Fig. 7B. For the lowest output frequency setting negative feedback exists up to a frequency beyond the highest output frequency available. Likewise, for the highest output frequency negative feedback exists down to a frequency below the lowest output frequency available.

The oscillator of Fig. 6A does not readily provide the practical gains required for wide frequency ranges. The bridge of Fig. 8A offers a better performance, the output of the bridge being fed into two tubes VT1 and VT2 having a common cathode impedance $Z_{c1}$. For very large feedback through this common cathode impedance $Z_{c1}$, each tube VT1 and VT2 effectively is driven by half of the bridge output voltage. The outputs of the two tubes are substantially in phase opposition, so that the second bridge may be fed from either tube as required to obtain a voltage of the desired phase. An oscillator having a pair of such bridges with five RC combinations, developed a frequency band having a ratio of over 1000 to 1, but some difficulty was experienced in tuning above the middle portion of the desired frequency range. This was caused by the added phase shift from the parasitic capacitances on the two potentiometer sliders. This pushed the loop phase shift through zero degree at a high frequency at which the transmission magnitude was greater than unity. As the frequency control was varied upward the frequency of oscillation jumped from the desired frequency, at which gain was unity with zero degree phase shift, to this additional frequency of zero degree phase shift, but of higher gain.

The series arm RC network N1 of Fig. 8B offers a means of working with the potentiometer parasitic capacitance, and forms the basis of an oscillator as illustrated in Fig. 2 with a frequency ratio of over 100,000 to 1 in practice, with a frequency ratio of a billion to one possible. The networks of Figs. 8A and 8B are both capable of performance similar to that shown in Figs. 5A and 5B. Transmission can be evaluated to a good approximation by relations of the bilinear form $$\frac{e_{out}}{e_{in}} = A \frac{1+jB\frac{f}{fc}}{1+j\frac{f}{fc}} \quad (2)$$

where A and B are constants. This equation gives rise to semi-circles or complete circles with diameters on the real axis when plotted on rectangular coordinates, imaginary or $j$ components parallel with one axis, real components parallel with the other axis. Equation 1 is a version of Equation 2. Semicircular plots arise from capacitive or inductive reactance alone in a network; circular plots develop from networks with both types of reactance.

*Oscillator loop transmission*

The oscillator of Fig. 2 presents a transmission loop which is opened out for analysis in Fig. 9. The plate of the tube VT1 offers a starting point, and a zero impedance generator voltage $e_1$ is assumed. The steady state response at the various parts of the oscillator loop will be discussed in several steps as follows. The numerical subscripts of Fig. 9 refer to the tubes VT1 ... VT4, and will be dropped in the discussion to follow: As to the RC network factor N, the input voltage $e$ gives rise to an output voltage N$e$. For example, $e_1$ becomes N$_4e_1$ across $R_{s2}$. As to the grid coupling network factor G, the voltage N$e$ becomes GN$e$ between the grid of the tube it drives and ground. For example, N$_4e_1$ becomes G$_4$N$_4e_1$. As to the potentiometer factor P, the input voltage $e$ gives rise to an output voltage P$e$. For example, $e_1$ becomes P$_3e_1$ between the slide of potentiometer P$_2$ and ground. As to the grid coupling network factor G, the voltage P$e$ becomes GP$e$ between the grid of the tube it drives and ground. For example, P$_3e_1$ becomes G$_3$P$_3e_1$. To improve the continuity of analysis, both this and the former G factors will be assumed identical and equal to unity until the last. As to the RC network, potentiometer bridge and cathode coupling factor, the output from the bridge is (GN$e$—GP$e$), or (N$e$—P$e$) for G=1. N$e$ gives rise to $v_N$, P$e$ to $v_P$, in the tube grid-cathode systems. The common cathode impedance coupling influences the proportioning of $v_N$ and $v_P$, which are substantially equal and opposite in phase as long as the common cathode impedance coupling is large. As to the plate load impedance factor, the output voltage across the plate load is proportional to $v_N g_m Z_{PL}$, or $v_P g_m Z_{PL}$ as the case may be, where $g_m$ is the tube transconductance, and $Z_{PL}$ is the impedance seen between the plate load impedance terminals.

To complete the loop analysis, the steps just outlined are repeated for the second pair of tubes, with appropriate modifications, such as interchanging $v_N$ and $v_P$ to accomplish the 180-degree turnover required. The basic 180-degree phase shift of each of the two sets of tubes drops out as a total of zero degree. The analysis will assume screen grid tubes for simplicity. Appropriate modifications for triodes can be made, although the grid plate capacitance of these tubes will complicate matters at high frequencies.

*RC network factor N*

The transmission $$\frac{v}{e}$$

through a resistance R, tapped at $aR$ as in Fig. 10A and the portion $(1-a)R$ bridged with a condenser C, is given by:

$$\frac{v}{e}=a\frac{1+j(1-a)\omega CR}{1+ja(1-a)\omega CR} \quad (3)$$

This Equation 3 is of the form of Equation 2, and gives rise to the semicircular plot of transmission shown in Fig. 10A. The peak reactive component of the transmission occurs at a frequency $f_c$ at which the condenser reactance is equal in magnitude to the two sections of the resistance R paralleled together. If the part $aR$ of the resistance R is tapped at $abR$, as in Fig. 10B, and transmission to this tap, instead of the tap $aR$, is evaluated, we have:

$$\frac{v_1}{e}=b\frac{v}{e} \quad (3a)$$

This gives a semicircular transmission plot, too. The semicircle of Fig. 10A intercepts the real axis at $a$ for zero frequency, and at 1 for infinite frequency. In Fig. 10B these intercepts are multiplied by the fractional factor $b$. The real axis intercepts become $ab$ for zero frequency, and $b$ for infinite frequency. Let us tentatively assume the condenser C to be a short circuit. This leaves the portion $aR$ of the resistance R as in Fig. 10C. This is tapped at $abR$ as before, and the portion $(a-ab)R$ is bridged with a condenser $C_1$. The transmission $$\frac{v_1}{v}$$

through this configuration is represented by a semicircle, with real axis intercept $b$ at zero frequency and 1 at infinite frequency. If the condenser C is very much larger than the condenser $C_1$, or more exactly, if the frequency of peak reactive transmission $f_c$ of Fig. 10B is very much lower than $f_{c1}$, that of Fig. 10C, the transmission through the whole network of Fig. 10D may be approximated as that of Fig. 10B and Fig. 10C. The semicircle through the intercepts $ab$ and $b$, and the semicircle through $b$ and 1 are laid side by side. For $f_{c1}$ about $16f_c$, the transmission is roughly approximated as a smooth envelope drawn over the two semicircles, as illustrated in Fig. 10E. This transmission characteristic is similar to that developed for Figs. 4C and 5A. Additional taps can be made on the resistance R, and the subdivisions bridged with condensers of appropriate size to extend the frequency range of nearly constant reactive transmission, just as for Figs. 4C and 5A.

While the construction has shown semicircles of equal size, the factors $a$ and $b$ may be suitably chosen to give semicircles of unequal sizes, proportioned as may be desired; the general method is outlined in Fig. 11.

A desired transmission characteristic may be built up of a number of semicircles, with RC elements set for suitably spaced frequencies. The relations between real axis intercepts of the component semicircles and the taps $aR$, $a(1-b)R$, etc., are shown in Fig. 11. The ratio of the two intercepts of the lowest frequency RC semicircle is $$\frac{ab\ldots mn}{b\ldots mn}$$

or $a$, of the next higher frequency section is $b$, etc. Equations 4 give a convenient method of evaluating the factors $a$, $ab$, etc., which is to divide all the semicircle intercepts into the product $(ab\ldots mn)$, which may be set as desired. It is preferably made small, as of the order of 0.1 or less. It is not critical, and can be adjusted as convenient values of resistance and capacity may require.

$$\begin{aligned}\frac{(ab\ldots mn)}{ab\ldots mn}&=1\\ \frac{(ab\ldots mn)}{b\ldots mn}&=a\\ &\ldots \\ \frac{(ab\ldots mn)}{n}&=ab\ldots m\\ \frac{(ab\ldots mn)}{1}&=ab\ldots mn\end{aligned} \quad (4)$$

The capacitance values are determined by equating reactance at the desired frequency $f_c$ to the resistance facing the capacitance, assuming all lower frequency RC sections to be shorted to a zero impedance generator, all higher frequency RC sections to be pure resistances. For example:

$$C_b=\frac{1}{2\pi f_{c_b}\frac{abR(a-ab)R}{aR}}$$

$$=\frac{1}{2\pi f_{c_b}ab(1-b)R} \quad (4a)$$

The shunt arm $(ab\ldots mn)R$ or $R_p$ of the RC network will be bridged with a parasitic capacitance $C_p$ as illustrated in Fig. 12A. The capacitance $C_n$ across the resistance $R_n$ will form with $C_p$ a potentiometer of some loss at infinite frequency, so that transmission will never become unity. The transmission for the two RC sections will be represented by Equation 5.

$$\frac{v}{e}=n\frac{1+j\omega C_nR(ab\ldots,mn)}{1+j\omega(C_n+C_p)R(1-n)(ab\ldots mn)} \quad (5)$$

which is of the bilinear form, indicating a semicircular locus. If the infinite frequency transmission is less than the direct current transmission, the semicircle swings below the real axis, as shown in Fig. 12A. The frequency of peak reactive transmission $f_{c_n}$ is given by Equation 6:

$$f_{c_n}=\frac{1}{2\pi(C_p+C_n)(1-n)(ab\ldots mn)R} \quad (6)$$

This equation indicates that the reactance of the condensers $C_p$ and $C_n$, paralleled, is equal in magnitude to the resistances bridging them, also parallel, at $f_{c_n}$. The effect of $C_p$ on the process of synthesizing a transmission characteristic with semicircles is to bring the intercept of the highest frequency semicircle from unity to a value $$\frac{C_n}{C_n+C_p}$$

Although $C_p$ is a definite and measurable capacitance, the value of $C_n$ will not be known at the start. A trial design must be carried through first, with a last semicircle somewhat larger than required. $C_n$ is calculated from Equation 6 and $$\frac{C_n}{C_n+C_p}$$

determined. The last semicircle is then readjusted accordingly as illustrated in Fig. 12B. The intercepts of all semicircles will be affected somewhat by the capacity potentiometer losses at infinite frequency, but these losses are usually negligible except for the last semicircle, and possibly the next to last one.

The shunting effect of the RC system, such as the network N1 and the bridge arm $R_{s1}$, on the paralleled potentiometer, such as P1, is allowed for in the shaping of the RC characteristic to rise with frequency. This shaping may be approximated as shown in Fig. 13A. The RC network is to be paralleled with a potentiometer of resistance $R_P$. The combined resistance at direct current is $$\frac{RR_P}{R+R_P}$$

At infinite frequency, the RC arm is reduced to $$\frac{(ab \ldots mn)RR_P}{(ab \ldots mn)R+R_P}$$

which neglects parasitic capacitances. At intermediate frequencies the input impedance of the RC arm may be approximated as inversely proportional to the real axis intercepts $r$ corresponding to the resistance taps of the RC arm. Thus a point halfway between $r=0$ and $r=1$ on the real axis would represent a resistance of twice the lowest tap $(ab \ldots mn)R$, which corresponds to $r=1$. The plate impedance $Z_{PL}$ is the parallel combination of the RC arm resistance and the potentiometer resistance $R_P$, and is given by:

$$Z_{PL}=\frac{R_P(ab \ldots mn)\frac{R}{r}}{R_P+(ab \ldots mn)\frac{R}{r}} \quad (7)$$

This is evaluated for a few points corresponding to say $r=0.25$, 0.5 and 1; the value at $r=0$ will be $R_P$.

The voltage gain of the tube driving the parallel combination will be $g_m Z_{PL}$, where $g_m$ is the transconductance of the tube. The transmission from the grid of the tube to the output of the RC network will be $Ng_m Z_{PL}$, and should be unity or slightly larger. This requires that $$N \geq \frac{1}{g_m Z_{PL}}$$

and gives rise to a straight line minimum boundary of the form:

$$N=\frac{r}{(ab \ldots mn)Rg_m}+\frac{1}{R_P g_m}=\frac{1}{g_m Z_{PL}} \quad (8)$$

and is shown in Fig. 13B. This straight line is the minimum requirement for N. The semicircles representing the RC network are fitted through this line as a guide as illustrated in Fig. 13C. Some margin should be allowed for network deviations and $g_m$ variation. The effective $g_m$ is reduced by about one-half in the circuit, as will be shown later. The low frequency end of the guide line is bent upward as required to allow for plate grid coupling network loss. The high frequency end is bent upward to allow for parasitic capacitance losses.

*Frequency adjustment potentiometer factor P*

The transmission through the potentiometer side of the bridge, as through potentiometer P1 of the bridge B1, is determined by the tap $kP1$ at low frequencies. At high frequencies, the parasitic capacitance C of Fig. 14A bridged on the slider and its connected equipment change the transmission as indicated in Equation 9:

$$\frac{v}{e}=k\frac{1-j\frac{f}{f_c}k(1-k)}{1+\left(\frac{f}{f_c}\right)^2 k^2(1-k)^2}$$

$$f_c=\frac{1}{2\pi C R_P} \quad (9)$$

Equation 9 also gives rise to semicircle transmission plots as in Figs. 14A and 14B. The curves for several frequency ratios $$\frac{f}{f_c}$$

are plotted in Fig. 14B by constructing circles for $k(1-k)=0.25$, 0.2105, 0.177, 0.1485, etc. (1.5-decibel intervals), and plotting intercepts with lines through the origin having slopes of these values. These lines represent $$\frac{v}{e}$$

transmission ratios having phase angles $$\theta = \arctan\left[-\frac{f}{f_c}k(1-k)\right]$$

Table 1 shows corresponding values of $k$ and $k(1-k)$, over a range of three octaves, which are useful in plotting the curves of Figs. 14B and 15.

TABLE 1

$$k=\frac{1}{2}\pm\sqrt{\frac{1}{4}+\frac{\tan\theta}{\frac{f}{f_c}}}=\frac{1}{2}\pm\sqrt{\frac{1}{4}-[k(1-k)]}$$

| $k(1-k)$ | $k$ | |
|---|---|---|
| 0.25 | 0.50 | 0.50 |
| 0.21 | 0.30 | 0.70 |
| 0.177 | 0.23 | 0.77 |
| 0.149 | 0.18 | 0.82 |
| 0.125 | 0.15 | 0.85 |
| 0.105 | 0.12 | 0.88 |
| 0.088 | 0.10 | 0.90 |
| 0.074 | 0.08 | 0.92 |
| 0.063 | 0.07 | 0.93 |
| 0.053 | 0.06 | 0.94 |
| 0.044 | 0.05 | 0.95 |
| 0.037 | 0.04 | 0.96 |
| 0.031 | 0.03 | 0.97 |
| 0.026 | 0.03 | 0.97 |
| 0.022 | 0.02 | 0.98 |
| 0.019 | 0.02 | 0.98 |

*Potentiometer—RC network bridge*

We are now ready to combine the RC network of Figs. 10 to 13 and the potentiometer of Figs. 14 and 15 into the bridge of Fig. 16A. The voltage output from the bridge (Ne—Pe) is determined, for a particular setting of the potentiometer, by the vector difference between the RC network output Ne and the potentiometer output Pe, over the zero to infinity frequency range. All settings of the potentiometer from $k=0$ to $k=1$ must be considered. The transmission characteristics of Fig. 13C and Fig. 15 are combined in Fig. 16B to evaluate the transmission through the bridge of Fig. 16A. The curves of Fig. 16C show the magnitude and phase of this transmission. The analysis so far is good for preliminary blocking out of a design. The actual case may be made to approximate it, as will be shown.

Fig. 17A shows the voltage relations at the bridge output and the connected tube grid cathode systems. Equations 10a to 10f express the transmission between the bridge input and the tube grid cathode systems. In these relations, $g_{m_N}$= grid plate transconductance of tube (N), $g_N$= grid plate+grid screen transconductance of tube (N), and supscript P replaces N for tube (P).

$$\frac{v_N}{e} = \frac{N(1+Z_{gP}) - PZ_{gP}}{1 + Z(g_N + g_P)} \quad (10a)$$

$$\frac{v_P}{e} = \frac{P(1+Z_{gN}) - NZ_{gN}}{1 + Z(g_N + g_P)} \quad (10b)$$

For $Z_{gN}$ and $Z_{gP} \gg 1$, Equations 10a and 10b reduce to:

$$\frac{v_N}{e} \doteq (N-P)\frac{g_P}{g_N + g_P} \quad (10c)$$

$$\frac{v_P}{e} = (P-N)\frac{g_N}{g_N + g_P} \quad (10d)$$

For $g_N = g_P$, Equations 10c and 10d reduce to:

$$\frac{v_N}{e} \doteq \frac{N-P}{2} \quad (10e)$$

$$\frac{v_P}{e} \doteq \frac{P-N}{2} \text{ or } -\frac{v_N}{e} \quad (10f)$$

For screen grid tubes with screen grids not by-passed to cathode as illustrated in Fig. 17B, the transconductances $g_N$ and $g_P$ include the sum of the grid plate and grid screen transconductances. The output from each tube to its plate load includes only the grid plate transconductance factor $g_{m_N}$ or $g_{m_P}$. For Fig. 17C with the by-passing capacity C large, the factors $g_{m_N}$ and $g_{m_P}$ apply instead of $g_N$ and $g_P$ in Equations 10a to 10d. If the by-passing condenser impedance is appreciable, a more complex situation exists, which is not considered here, but the analysis may readily be made.

In the case of Fig. 17B, the cathode-to-ground impedance $Z_c$ is composed of all impedances bridged between cathode and ground, including $Z_{c1}$, the screen generator resistances $R_{0s1}$ and $R_{0s2}$, the plate generator resistances, and all capacitances from cathodes to ground. These include among others capacitances to screens, grids and heaters. In the case of Fig. 17C the cathode-to-ground impedance $Z_c$ is composed of all impedances bridged between cathodes and ground. In this case the screen generators are short-circuited back to the cathodes through the very large condensers C. The resistance $Z_{c1}$ is paralleled with the plate generator resistances, the screen decoupling impedances $Z_{s1}$ and $Z_{s2}$, and all capacitances from cathodes to ground. These include, among others, capacitances to plates, grids and heaters.

*Cathode coupling impedance factor*

As shown in Equations 10a and 10b, the multiplying factors operating on the N and P vectors depend on the cathode impedance Z (or $Z_c$). These factors are readily analyzed for $Zg_N$ and $Zg_P > 1$ by the approximation formulas given in Equations 11a to 11d.

For $Zg_P > 1$, $$\frac{1 + Zg_P}{1 + Z(g_N + g_P)} \doteq \frac{g_P}{g_N + g_P}\left[1 + \frac{g_N}{g_P}\frac{1}{Z(g_N + g_P)}\right] \quad (11a)$$

$$\frac{Zg_P}{1 + Z(g_N + g_P)} \doteq \frac{g_P}{g_N + g_P}\left[1 - \frac{1}{Z(g_N + g_P)}\right] \quad (11b)$$

For $g_N = g_P = g_m$ $$\frac{1 + Zg_m}{1 + 2Zg_m} \doteq \frac{1}{2}\left(1 + \frac{1}{2Zg_m}\right) \quad (11c)$$

$$\frac{Zg_m}{1 + 2Zg_m} \doteq \frac{1}{2}\left(1 - \frac{1}{2Zg_m}\right) \quad (11d)$$

Normally $g_N$ and $g_P$ will be almost equal and Equations 11c and 11d will show the effects of the $Zg_m$ factor for values greater than unity.

In general Z will be complex. Let us assume Z is composed of a resistance bridged with a capacitance. The quantity $Z = R_z + jX_z$ will have a negative phase angle, for $X_z$ is a negative reactance at all frequencies above zero. The factor $Zg_m$ likewise has a negative phase angle. The quantity $$\frac{1}{2}\left(1 + \frac{1}{2Zg_m}\right)$$

which multiplies the N vector (see Equations 10a and 11c), then has a positive phase angle, and rotates the multiplied N vector in a positive direction (see Fig. 18A). Likewise the quantity $$\frac{1}{2}\left(1 - \frac{1}{2Zg_m}\right)$$

which multiplies the P vector (see Equations 10a and 11d) has a negative phase angle, and rotates the multiplier P vector in a negative direction (see Fig. 18B). The N vector is also lengthened slightly by the multiplying factor, the P vector shortened. The difference between the multiplied vectors, as expressed by Equation 10a, is a measure of the transmission between the bridge input and the tube grid cathode system, such as of VT1 of Fig. 16A. This difference, $N-P$, as operated on by the multipliers, is increased by the capacitive impedance Z. These relations hold since N, multiplied, will ordinarily lead P, multiplied, by an angle, between 0 degree and 180 degrees, and not between 180 degrees and 360 degrees. Similarly an inductive impedance Z will cause a decrease in transmission through the bridge to the plate of tube VT1, Fig. 16A. Likewise, as indicated by Equations 10b, 11c and 11d, the transmission to tube VT2 of Fig. 16A will be decreased by a capacitive impedance Z, and increased by an inductive impedance.

Of the two tubes VT1 and VT3 driving the two bridges B1 and B2 in the oscillator loop, the tube VT1 will be driven by $v_N$, and the tube VT3 by $v_P$. It may therefore be desirable to use different cathode networks in the two pairs of tubes VT1, VT2 and VT3, VT4 connected to the two bridges B1 and B2, but at high frequencies all networks are effectively only parasitic capacitance. Alternatively, the bridge B2 may be modified to increase its transmission at high frequencies by suitably shaping the network N2 in the manner already shown. The value of $Zg_m$ should be made large in order to keep the reaction on loop transmission small. A small effect in one bridge tends to cancel that in the other bridge, because of the interchange of the factors multiplying N and P in the two bridges B1 and B2 inherent in the 180-degree turnover between the bridges. The value of $Zg_m$ can be made large by using the plate circuit of a triode or pentode as a two-terminal impedance as illustrated in Fig. 19A. Negative feedback is useful for increasing the effective impedance, as illustrated in Fig. 19B, and Equation 12 shows the impedance multiplying factor $K_z$ for the triode arrangement; the parasitic capacitance $C_{ps}$ is not affected by feedback:

$$K_s = 1 + \frac{Z_c g_{mt}}{1 + \frac{Z_c}{R_0} + \frac{Z_c}{\frac{1}{\omega C}}} \doteq 1 + Z_c g_{mt}$$

for $$\begin{pmatrix} Z_c \ll R_0 \\ Z_c \ll \frac{1}{\omega C} \end{pmatrix}$$

$$\omega = 2\pi f$$

$$g_{mt} = \frac{\mu}{R_0} \qquad (12)$$

A large direct-current resistance common to both cathode circuits of the tubes VT1 and VT2, or of the tubes VT3 and VT4, causes any dropping off in the direct-current cathode current of one tube to be complemented by an increase in the cathode current of the other tube. The transconductance of each tube is proportional to the cathode current, although not directly so. As will be shown, frequency stability depends on transconductance stability. A considerable improvement in cathode current stability, and so, frequency stability, may be had by providing, as an alternative to the two-terminal impedance Z or $Z_c$ common to two cathodes, two separate large resistance paths, one in the cathode circuit of each tube. The cathodes of pairs of tubes, as tubes VT1 and VT2, may be effectively coupled together by a large condenser in order to provide separation at direct current, and good transmission from cathode to cathode from very low frequencies to very high frequencies, as may be required in the oscillator loop. Over all but the very lowest part of the frequency range the condenser referred to may be considered to connect the separate cathode circuit networks in parallel, and the preceding analysis for a two-terminal cathode impedance Z or $Z_c$ will apply. Over the lowest part of the frequency range, the condenser connecting the cathodes together will cause a transmission loss which should be included in the design of the oscillator loop. In this frequency region the grid plate coupling networks usually are the major factors in the absence of cathode transmission factors. Also, the cathodes may be coupled with two-terminal impedances or with three or even four-terminal networks, any of which may include transformers.

*Plate grid coupling network factor G*

Figure 20A:
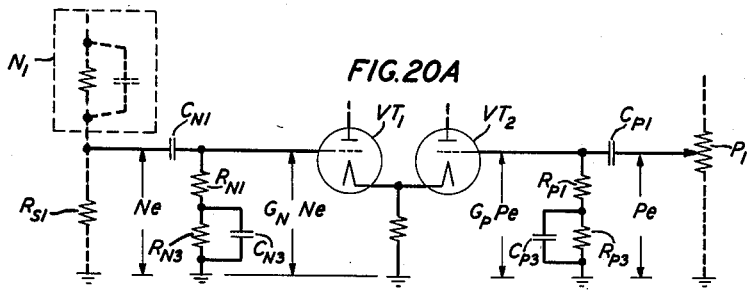
Figure 20B:
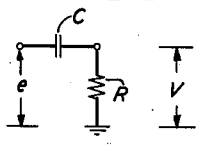

Both of the bridge output components $Ne$ and $Pe$ are modified at low frequencies by the factor G for the plate grid coupling system, as shown in Fig. 20A. The N vector multiplied by its G factor $G_N$ should lead the P vector, multiplied by its G factor $G_P$, over the low frequency range as long as the oscillator loop shows a gain for any setting of the frequency control potentiometer. The G factor for the N vector can be given a slightly more positive phase angle than that for the P vector. To this end, the RC product of the coupling system for the N tube grids of VT1 and VT4, is made slightly smaller than that for the P tube grids of VT2 and VT3. Assuming $C_{N3} \gg C_{N1}$ and $C_{P3} \gg C_{P1}$, the required relations are expressed by:

$$R_{N1}C_{N1} < R_{P1}C_{P1} \qquad (13a)$$

Figure 20C:
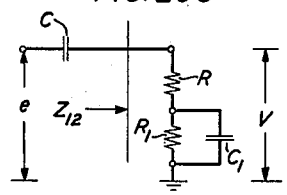

The $R_1C_1$ combination of Fig. 20C, or the $R_{N3}C_{N3}$ combination and the $R_{P3}C_{P3}$ combination of Fig. 20A, is included in series with the grid return in order to provide a negative phase shift which holds the oscillator loop phase shift away from zero degree at frequencies near the low frequency gain cross-over through unity, or zero decibel. This helps to prevent very low frequency oscillation below the useful band of the oscillator and improves the damping of low frequency transients so that the oscillator output is better stabilized during adjustments and other disturbances.

The G factor may be evaluated in two steps. As long as $C_{N3} \gg C_{N1}$ and $C_{P3} \gg C_{P1}$, the transmission may be evaluated from Fig. 20B, letting $R_{N1} = R$, $C_{N1} = C$, etc.

$$\frac{v}{e} = \frac{R}{R + \frac{1}{j\omega C}} \qquad (13b)$$

$$\doteq j\omega CR \text{ for } R \ll \frac{1}{\omega C} \qquad (13c)$$

As frequency decreases, $$R \ll \frac{1}{\omega C}$$

and the $R_1C_1$ combination begins to add to R, forming the impedance $Z_{12}$ of Fig. 20C:

$$Z_{12} = (R + R_1) \frac{1 + j\omega C \frac{RR_1}{R + R_1}}{1 + j\omega C R_1} \qquad (13d)$$

This impedance $Z_{12}$ may be substituted for R in Equation 13b, and the G factor expressed to a good approximation as:

$$G = \frac{v}{e} = \frac{Z_{12}}{R + \frac{1}{j\omega C}} \qquad (13e)$$

Figure 20D:
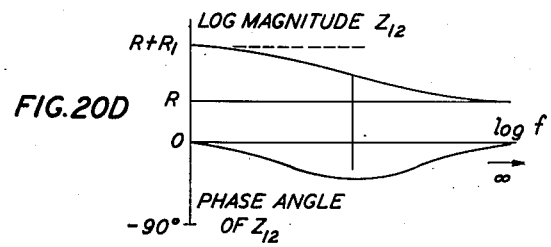

Equations 13b and 13d may be represented by semicircles, but in this case, the magnitude and phase plots for Equation 13d, as typified in Figs. 20D and 21, are more convenient to use. Fig. 21 is a plot of magnitude and phase characteristics of the bilinear equation:

$$x + jy = \frac{1 + jB\frac{f}{f_c}}{1 + j\frac{f}{f_c}} \qquad (13f)$$

*Plate load impedance factor*

In a screen grid tube, the plate generator resistance will be much greater than the load impedance $Z_{PL}$ connected to the plate, and may be ignored to a good approximation. In usual designs, the shunting effect of the plate grid coupling networks, such as $C_{N1}$, $R_{N1}$, $C_{N3}$, $R_{N3}$, etc., upon the plate load impedance also may be ignored. For low frequencies, the plate load is typically represented by Fig. 22, and by Equation 14, which is of bilinear form:

$$Z_{PL} = Z_{12} = \frac{RR_P}{R + R_P} \frac{1 + j\frac{a(1-a)R}{\omega C}}{1 + j\frac{(aR + R_P)(1-a)R}{(R + R_P)\omega C}} \qquad (14)$$

The curves of Fig. 21 may be used to determine magnitude and phase shift. The values of R and C will be different at different frequencies as the several RC combinations successively come into prominence. Typical frequencies such as $f_{C1}$, $f_{C2}$, etc., may be used, the same as were used for determining $C_a$, $C_b$, etc., in Fig. 11, with the same assumptions. At high frequencies the parasitic capacitances of the connected grids and the plate contribute appreciably, and no simple approximation of the impedance can be set down. At very high frequencies, the impedance may be approximated as appropriate resistance and capacitance in parallel, with the latter dominant. The voltage across the plate load impedance $Z_{PL}$ may be represented by:

$$v_{PL} = v_N g_m Z_{PL} \text{ or } v_p g_{m_p} Z_{PL} \quad (15)$$

according to whether the tube is driven by $v_N$ or $v_P$. $Z_{PL}$ is given by Equation 14 for low frequencies, and is modified as required at high frequencies to include parasitic capacitance effects.

Transit time effects

At frequencies in the megacycles per second, tube transit times add to the loop phase shift, and cannot be neglected. For a 6AK5 type of tube, this factor may add a phase shift of the order of 0.2 degree per megacycle per stage. The physical size of the loop also contributes, but is a smaller factor in a normal design. The input impedance of the tube will develop a resistive component at very large frequencies which should be considered if necessary.

The evaluation of the foregoing loop transmission factors for both bridges B1 and B2 and their associated equipment gives a workable approximation of the loop transmission. The analysis can be further refined to include minor contributions or circuit modifications if desired. For instance, the capacitance between the plate and the suppressor grid, which is tied to the cathode, shunts the plate generator. As long as this capacitance is small compared with plate-to-ground and cathode-to-ground capacitance, its contribution will be small. A more complex analysis can be made with well-known methods to include its effect.

Figs. 23A to 23C show transmission magnitude and phase for the feedback loop of a typical oscillator at extreme and middle frequency settings. Prominently demonstrated are the extremely broad bands, stretching well beyond the actual frequency adjustment range, in which negative feedback exists. The feedback magnitudes range up to some 50 decibels.

The ripples in the RC network transmission can be compensated somewhat by staggering the critical frequencies $f_c$ of the two RC networks N1 and N2 in the two respective bridges B1 and B2, as shown in Fig. 24A. The configuration of the RC arm also may be modified to advantage, and the frequency ratios of 16 to 1 for successive sections may be changed. A mathematical approach involving the Tschebyscheff approximations or some other technique may be utilized. While the typical oscillator discussed has been based on simple RC networks, other networks using inductances, and more complex configurations may be utilized, a few of which have been shown in Figs. 1A to 1E.

Fig. 24B shows a modification of the paralleled RC system for isolating the high frequency inductive impedance which may be met in some of the larger condensers used for low frequencies. In this case the condenser $C_{a1}$ is larger than $C_{b1}$, and capacitive at low frequencies. If the condenser $C_{b1}$ is bridged across both resistances $R_{a1}$ and $R_{b1}$, instead of across $R_{b1}$ alone, it may be expected to shunt out the effect of the condenser $C_{a1}$ at frequencies well above the range in which it, $C_{a1}$, contributes heavily to the reactive component of the bridge transmission. Some slight readjustment of the element values may be desirable to make the two configurations of Fig. 24B most nearly equivalent in two-terminal impedance between points 1 and 2 thereof.

Extreme frequency range depends on the gain available to compensate for the bridge losses. The top frequency gain is limited by the parasitic capacitance of the amplifier system. If the top frequency is reduced by one-half, the capacity reactance limiting the tube gain is doubled, and the realizable gain is doubled too, as illustrated in Figs. 24C and 24D. The bridge loss then can be doubled by halving the semicircle diameters. Twice as many semicircles can be accommodated, as in Fig. 24C, and the extreme highest-to-lowest frequency ratio is roughly squared. The lowest frequency can be reduced decades below one cycle per second to regions in which insulation resistance will be a limiting factor.

The frequency calibration of the dial is nearly a logarithmic function of linear scale divisions with control potentiometers in which resistance change is directly proportional to slider rotation or displacement. This nearly logarithmic relation arises from the nearly linear variation of the resistive component of the RC network impedance, as in Fig. 4C, with the logarithm of frequency. The linear asymptote through which the real or resistive component of the RC arm transmission oscillates would give rise to a logarithmic frequency adjustment dial scale, but for several factors. Most prominent are that the RC arm envelope asymptote has a slope and that the plate grid coupling networks and parasitic capacitance introduce phase and magnitude changes as the extreme frequencies are approached.

The phase angle between the stage outputs is nearly 90 degrees. This arises from the 180-degree reversal in the two bridges B1 and B2, leaving 180 degrees of phase shift to be split between the two bridge units. The split is almost even, with some unbalance caused by the two different multiplying factors operating on the N and P vectors (Equations 10 and 11). Deviations of the frequency adjusting potentiometers from perfect alignment with each other also contribute to the dissymmetry. The phase angle between the outputs of the N and P tubes of the same stage is roughly 180 degrees, which may be modified by the different multipliers of the N and P vectors, and different plate load impedances. Thus the outputs of the tubes VT1 and VT2 in Fig. 1 are roughly opposite in phase, as are those of the tubes VT3 and VT4. The output of the tube VT3 is displaced roughly 90 degrees from that of the tube VT1. It follows that the outputs of tubes VT2 and VT4 are similarly related. Thus a four-phase output, with phases distributed at roughly 90-degree intervals, may be derived from the four plate circuits of the tubes VT1 to VT4. Direct connection may be made to the plates of the tubes VT2 and VT4 without seriously disturbing the oscillator. Connection to either of the plates of the tubes VT1 and VT3 is preferably made through a buffer amplifier in order to avoid reaction on the oscillator from the different connected loads.

The effect of misalignment of the frequency adjusting potentiometers P1 and P2 may be examined as follows. Let both potentiometers be perfectly aligned, and set for an oscillation frequency $f$. Let both potentiometers be shifted slightly so that the frequency changes to $f + \Delta f$;

If either potentiometer is returned to its original setting, while the other remains shifted, the frequency will be shifted from $f+\Delta f$ toward $f$. As both potentiometers ordinarily contribute about equally in determining the frequency, the resulting frequency will be very nearly $$f+\frac{\Delta f}{2}$$

For small deviations between the potentiometers P1 and P2, no great change in loop gain will result. Such changes will in general be increases, as for $f_2$ in Fig. 25, in which the deviation causes both $(N-P)$ vectors to lengthen. The phase angles $\phi_1$ and $\phi_1+\Delta\phi_1$ shown for $f_1$ are less than 90 degrees in order to allow for the contributions of the plate grid coupling networks at low frequencies. These networks bring the total phase shift of each stage to about 90 degrees. The phase angles $\phi_3$ and $\phi_3+\Delta\phi_3$ for $f_3$ are more than 90 degrees because of the parasitic capacitances of the plate load impedances. These add negative phase shift and bring the contributions of each stage to about 90 degrees.

If the oscillator output is limited by extreme tube overloading, the wave form is degraded. It is preferable to use some other sort of gain control, such as grid bias automatic volume control, or a thermistor. Fig. 26A shows thermistor control shunted across one of the oscillator bridges B1. This consists of thermistor T1, resistors $R_{T1}$ and $R_{T1}$ and condenser $C_{T1}$. The excess gain should be kept small, so that the resistance of the thermistor T1 may be kept high. Also, the capacitance of the blocking condenser $C_{T1}$ disposed in series with the thermistor T1 should be large, in order to reduce the influence of the thermistor T1 and the condenser $C_{T1}$ on the output frequency. As shown in Fig. 26B, the resistance $R_{T1}$ by-passing the condenser $C_{T1}$ brings the operating point of the thermistor T1 beyond the voltage peak to avoid having to build up 20-volt amplitudes (for this particular thermistor) before regulation can take place. The resistance $R_{t1}$ in series with the thermistor T1 serves to adjust the slope of the regulation characteristic. A regulated output may be taken from the plate of the tube VT3 in Fig. 26A, preferably through a buffer amplifier tube to isolate the oscillator from the connected loads. However, some isolation of the load circuit from the oscillator may be had by connection of the load to the plate of tube VT4, or tube VT2. The anode electrode of the tube VT4 may be connected to the input of a buffer amplifier tube VT7. The resistor $R_{G7}$ provides a return resistance, the resistor $R_{K7}$ provides a negative bias for the grid with respect to the cathode of VT7, RL5 provides a plate load resistor across which output voltage is developed, and condenser $C_{L5}$ blocks direct current from any output load which may be connected to the tube VT7.

Because the input impedance of the bridge B1 falls off at high frequencies, the current into the bridge B1 will be caused to rise with frequency to maintain the required voltage across the thermistor T1. This rise in current supplied by the tube VT3 implies an increase of driving voltage on the grids of tubes VT3 and VT4. If the oscillator output is taken from a pure resistance as $R_{L2}$ without the shunting thermistor circuit $T_2$, $R_{t2}$, $R_{T2}$ and $C_{T2}$ of Fig. 26A, the output voltage will rise with frequency. The shunting thermistor circuit $T_2$, $R_{t2}$, $R_{T2}$ and $C_{T2}$ helps to reduce the output voltage variations across $R_{L2}$. Further reduction of these variations may be had by shunting the equalizing impedance N3 and $R_{s3}$ across the plate load of the tube VT4 as in Fig. 26A, so that the load impedances of tubes VT3 and VT4 are made alike, with $R_{L2}$ and P1 equal in resistance, and networks N1 and N3, and resistances $R_{s1}$ and $R_{s3}$ made alike or reasonably so. The network N3 need not be as critical as N1 in its design.

Harmonic output is proportional to the excursions of the tube currents. The tube system will act as an amplifier being driven by the fundamental frequency of the oscillator, and the harmonics incidental to the fundamental output will be present. In general, the smaller this output, the smaller the distortion. Over the lower end of the frequency range, some negative feedback to harmonics is developed. At the high end of the range, the feedback is negative to the lower frequencies. The phase angle of the loop transmission at harmonic frequencies should be kept as far from zero degree as possible, in order to keep down the harmonic output.

Frequency stability is dependent on many factors, the most prominent of which is the tube gain stability. The non-linearity of the tubes also contributes, as well as the stability of the frequency control elements. The tube gain variation is the largest source of frequency drift, and demonstrates the need for a large cathode feedback. The components of the transmission ratio $$\frac{v_N}{e}$$

are shown in Fig. 27. Equations 16a and 16b give the changes in the components of the effective grid cathode voltage $v_N$ for changes in the tube gain factors $g_N$ and $g_P$. In Fig. 1 or Fig. 2, $v_N$ and $g_N$ would apply to tube VT1 (or VT4), and $g_P$ to tube VT2 (or VT3), $$dN_0 = d\left(\frac{1+Zg_P}{1+Zg_P+Zg_N}\right)N = \frac{1+Zg_P}{1+Zg_P+Zg_N}N\left(\frac{Zg_N\,dZg_P}{(1+Zg_P)(1+Zg_P+Zg_N)} - \frac{dZg_N}{1+Zg_P+Zg_N}\right) \quad (16a)$$

$$dP_0 = d\left(\frac{Zg_P}{1+Zg_P+Zg_N}\right)P = \frac{Zg_P}{1+Zg_P+Zg_N}P\left(\frac{(1+Zg_N)dZg_P}{Zg_P(1+Zg_P+Zg_N)} - \frac{dZg_N}{1+Zg_P+Zg_N}\right) \quad (16b)$$

The change $\Delta N_0 - \Delta P_0$ produces a resultant $$\Delta\frac{v_N}{e}$$

which shifts the phase of $$\frac{v_N}{e}$$

A change in frequency $\Delta f$ produces a change $\Delta N$ in the transmission N through the network N1. Such a change $\Delta N$ of proper magnitude can also produce a change in $$\frac{v_N}{e}$$

which is marked by a phase shift which will just cancel the phase shift caused by $$\frac{\Delta v_N}{e}$$

The shift in frequency caused by the change in tube gain can thus be evaluated in terms of tube transconductance and the transmission characteristics of the feedback loop. Any shift in frequency to restore zero phase shift around the loop as the gain changes in any one tube will operate to produce phase shifts in both of the oscillator bridge circuits. These will be nearly equal in the two bridges, so that the frequency shift is only half of that evaluated from Fig. 27.

Fig. 28 shows typical frequency shifts for interchanges of tubes VT1 and VT2, or of tubes VT3 and VT4, in cases where the transconductance of the tube VT1 is 12 per cent higher than that of the tube VT2. The higher the impedance of the cathode network, the less the frequency shift. In Fig. 28, the low impedance cathode network is composed of resistance $R_{k1}$ and inductance $L_{k1}$. In the higher impedance network thereof, the resistance $R_{k2}$ and inductance $L_{k2}$ are added. The shunting effect of the screen generator impedances $R_{0s1}$ and $R_{0s2}$ in limiting the effective cathode impedance is apparent.

Frequency shift of an amplitude-regulated oscillator as a function of output well below overload may be evaluated by means of the following approximate analysis (non-linear analysis is more or less so). Well below overload, a driving voltage $E$ may be considered modified to $FE$ by the non-linearity, and the circuit considered linear:

$$FE = E + a_2 E^2 + a_3 E^3 + a_4 E^4 + a_5 E^5 \quad (17)$$

where $a_2, a_3 \ldots a_n$ are small constants. For a first approximation, terms of third degree and higher may be neglected; viz.:

$$FE = E + a_2 E^2 \quad (17a)$$

Let
$$E = e_1 \cos x \quad (17b)$$

then
$$FE = e_1 \cos x + \frac{a_2 e_1^2}{2} \cos 2x \quad (17c)$$

dropping the direct-current term
$$\frac{a_2 e_1^2}{2}$$

Let
$$\frac{a_2 e_1^2}{2} = e_2 \text{ or } a_2 = \frac{2 e_2}{e_1^2} \quad (17d)$$

then
$$FE = e_1 \cos x + e_2 \cos 2x \quad (17e)$$

If any of the output is fed back into the driving circuit, all products are operated on by feedback, and the driving voltage is added to by the fedback products.

To a first approximation, the fundamental voltage acting on the system is $e_1 \cos x$. This gives rise to a second harmonic voltage $e_2$ which is operated on by feedback and becomes $v_2$:

$$v_2 = \frac{e_2}{1 - A_2} \text{ where } A_2 = \text{feedback to second harmonic} \quad (17f)$$

The driving voltage $E$ becomes $E_A$:

$$E_A = e_1 \cos x + v_2 \cos 2x \quad (17g)$$

and $$FE_A = \left\{ e_1 + \frac{2 e_2 v_2}{e_1} \right\} \cos + v_2 \cos 2x + \frac{2 e_2 v_2}{e_1} \cos 3x \quad (17h)$$

Let
$$v_2 = V_2 \cos \Phi_2 + j V_2 \sin \Phi_2 \quad (17i)$$

Then
$$FE_A = \left\{ e_1 + 2\frac{e_2}{e_1} V_2 \cos \Phi_2 + j 2 \frac{e_2}{e_1} V_2 \sin \Phi_2 \right\} \cos x + \ldots \quad (17j)$$

The real component
$$2 \frac{e_2}{e_1} V_2 \cos \Phi_2$$

adding to $e_1$ is negligible; the quadrature component
$$j 2 \frac{e_2}{e_1} V_2 \sin \Phi_2$$

shifts the phase of the fundamental by an angle:

$$\Delta \theta_1 = \arctan \left\{ \frac{2 e_2}{e_1} \frac{V_2}{e_1} \sin \Phi_2 \right\} \quad (17k)$$

The phase shift of the fundamental must be zero. The phase shift $\Delta \theta_1$ is counterbalanced by a change in phase shift $-\Delta \theta_1$ resulting from a shift in fundamental frequency:

$$-\Delta \theta_1 = \frac{d\theta_1}{df} \Delta f \quad (17l)$$

where
$$\frac{d\theta_1}{df}$$

is evaluated from the loop transmission at the fundamental frequency:

$$\frac{v}{e} = |A_1| \underline{/\theta_1} \quad (17m)$$

From (17e) and (17k)

$$\Delta f = -\Delta \theta_1 \frac{df}{d\theta_1}$$

$$= -\frac{2 e_2}{e_1} \frac{V_2}{e_1} \sin \Phi_2 \frac{df}{d\theta_1} \quad (17n)$$

for $|\Delta \theta_1| \ll 1$ radian

Equation 17n may be used for a fair approximation for values of $|\Delta \theta_1|$ up to 1 radian. From Equations 17f, 17i and 17n:

$$\Delta f = -\frac{df}{d\theta_1} \left[ 2 \frac{e_2^2}{e_1^2} \frac{\sin \Phi_2}{|1 - A_2|} \right] \quad (17o)$$

$$\frac{d\theta_1}{df}$$

is negative at $f_1$; for $\theta_2$ between 0 degree and $-180$ degrees, $\sin \Phi_2$ is negative and $\Delta f$ is positive. Thus increasing amplitudes result in a downward shift of frequency. This shift is proportional to the square of the amplitude $e_1$, as long as $e_2$ is proportional to the square of $e_1$. This holds for small amplitudes. At larger amplitudes, higher order terms beyond $E + a_2 E^2$ come into significance.

With feedback magnitudes and phase angles changing slowly with frequency in the region between fundamental and second harmonic, $|1 - A_2|$ may become less than unity. The term $\sin \Phi_2$ of equation 17o is zero for $\Phi_2 = 0$ and maximum for $\Phi_2 = 90$ degrees. It reduces again to zero for $\Phi_2 = 180$ degrees. This would indicate that $\Phi_2$ should be held between $\pm 90$ degrees and 180 degrees, and $|A_2|$ should be as large as possible to minimize the effect of fundamental amplitude variation on frequency shift of the fundamental. Thus negative feedback reduces both harmonic output and frequency shift, while positive feedback encourages their production. It is also desirable to keep oscillation amplitude down to a small value and to use a separate amplifier if large outputs with low distortion are desired and if frequency change with output variation is to be kept small. It should be noted that $e_2$ is the generated harmonic amplitude without feedback or modification by transmission through any part of the feedback loop. In the case of a tube, the relative magnitudes of $e_1$ and $e_2$ may be measured as output currents, or voltages across a small resistance. It may be noted that in a feedback amplifier the fundamental voltage $e_1 \cos x$ is the sum of the fedback voltage $A_1 e_1 \cos x$ and the input voltage $e_{in} \cos x$:

$$e_{in} \cos x = e_1(1-A_1) \cos x \text{ or } e_1 = \frac{e_{in}}{1-A_1} \quad (18)$$

In an oscillator $e_{in} = 0$ and $A_1 = 1$ and $$e_1 = \frac{0}{0}$$

if $e_{in}$ is considered a very small noise voltage, $A_1$ is very slightly less than unity and:

$$e_1 = \frac{\delta e_1}{\delta} \text{ where } \delta \doteq 0 \text{ and } e_{in} = \delta e_1$$

A third term $a_3 E^3$ may be added to Equation 17a to improve the approximation. The process is similar to that already outlined. As many additional terms as may be desired can be added to represent the physical process.

The oscillator may be frequency modulated in several ways, as shown in Figs. 29A and 29B for example. For this purpose, a variable impedance, such as a tube or a thermistor may be inserted in any bridge arm. For example, as shown in Fig. 29A, the modulator tubes VT5 and VT6 replace the resistance arms $kP_1$ and $kP_2$ of Fig. 1 and Fig. 2 and are varied in impedance by means of a signal source S. In Fig. 29B, the modulator tubes VT5 and VT6 are transferred to replace the resistance arms $R_{s1}$ and $R_{s2}$. For small deviations, one such variable impedance will be sufficient; but for large deviations, it may be desirable to use ganged variable elements in both bridges B1 and B2 as shown. If the loop gain varies over the deviation range, and fast frequency changes are desired, an instaneous limiter type of amplitude control may be utilized to maintain oscillation.

If the loop gain is reduced below zero decibel, the oscillator may be used as a tuned amplifier as illustrated in Fig. 30. With relatively small rates of change of the gain and phase with frequency in the region of zero phase shift, the transmission characteristic will be broad. Such an arrangement also might be used as a source of two- or four-plate output voltages in quadrature. The input may be coupled into the amplifier as shown in Fig. 30, or through an added tube connected to any plate, grid or cathode, or through direct connection to any part of the loop, or through an auxiliary electrode, such as a screen grid or suppressor grid.

The addition of another tube, such as the tube VT8 in Fig. 31, in the feedback loop, eliminates the turnover in the bridge connections, but introduces the problem of stabilization of a three-stage amplifier. This may be a desirable alternative to the problem of the vector $$\frac{NZg_m}{1+Zg_m}$$

associated with tubes VT3 and VT4 of Fig. 2 overtaking the vector $$\frac{P(1+Zg_m)}{1+Zg_m}$$

as $Zg_m$ becomes capacitive and decreases at high frequencies. The low frequency stabilization of the oscillator is accomplished by staggering the plate grid coupling cut-off frequencies for the three stages. The high frequency stabilization is accomplished with the combination consisting of resistances R100 and R101, condenser C100 and inductance L100 connecting the output of the tube VT4 to the input of the added tube VT8, or it may be accomplished in some similar manner. Also a transformer, or other suitable network may be utilized in place of the tube VT8 and its associated network.

Any or all of the tubes VT1, VT2, VT3 and VT4 may be replaced by multitube amplifiers as long as the oscillator loop transmission is kept within the prescribed bounds of amplitude and phase angle. Such amplifiers may have feedback paths in addition to that including the main oscillator loop. Their design is well known in the art.

Fig. 32 shows an oscillator circuit employing a single frequency controlling bridge B1. The network N4 of Fig. 32 provides the additional phase shift in the transmission loop that is needed to bring the total loop phase shift to zero degree at any frequency in a band over which the oscillator is variable. As an illustrative example, the network N4 of Fig. 32 may comprise a transformer T110 and a network comprising inductances L111 and L112, condensers C113 and C114, and resistance R110.

Although this invention has been described and illustrated in relation to specific arrangements, it is to be understood that it is capable of application in other organizations and is therefore not to be limited to the particular embodiments disclosed.

What is claimed is:

1. Apparatus for producing oscillations over a range of frequency values comprising transmission loop circuit means including a source of gain and a bridge of the type having input and output terminals separated by arms of the bridge, at least one arm of said bridge comprising a two-terminal network including series and parallel combinations of reactance and resistance elements, said loop circuit means constituting means for providing at any one of said frequency values a resultant net zero degree phase shift around said loop circuit with a gain of at least unity value in said loop circuit, said bridge constituting means for providing between the input and output thereof a transmission or voltage ratio characterized by a phase shift varying substantially from zero to 180 degrees over a substantially zero to infinity frequency band, said frequency at any one of said frequency values within said range of frequency values being a value at which a phase shift occurs in said bridge of any value between said zero and 180 degrees such that said phase shift around said transmission loop is said zero degrees, and means varying the impedance value of at least one fo the arms of said bridge for thereby adjusting said phase shift to correspond to any one of said frequency values within said range of frequency values, and means for maintaining said transmission ratio through said bridge and the remainder of said transmission loop circuit at a substantially constant magnitude for said frequency values within said range of frequency values.

2. Apparatus for producing oscillations over a range of frequency values comprising a transmission loop circuit including two tandem-connected frequency-determining bridges of the type having input and output terminals separated by arms of the bridge and sources of gain therefor, at least one arm of each of said two bridges including a two-terminal network having series and parallel combinations of reactance and resistance elements, each of said two bridges constituting means for providing an output to input transmission voltage ratio characterized by a phase shift varying from zero to ±180 degrees over a substantially zero to infinity frequency band, said frequency at any one of said frequency values within said range of frequency values being a value at which a substantially 90-degree phase shift occurs in each of said two bridges, and means varying the impedance value of at least one of the arms of at least one of said bridges for thereby adjusting said frequency to any one of said frequency values within said range of frequency values.

3. Apparatus for producing oscillations over a range of frequency values comprising a transmission loop circuit including two tandem-connected frequency-determining networks of the type having input and output terminals separated by arms of the network and sources of gain therefor, at least one arm of each of said two networks comprising a two-terminal sub-network having series and parallel combinations of reactance and resistance elements, each of said two networks constituting means for providing an output to input transmission voltage ratio characterized by a phase shift varying from zero to ±180 degrees over a substantially zero to infinity frequency band, said frequency at any one of said frequency values within said range of frequency values being a value at which a substantially 90-degree phase shift occurs in each of said two networks, and means varying the impedance value of at least one of the arms of at least one of said networks for thereby adjusting said frequency to any one of said frequency values within said range of frequency values.

4. Apparatus for producing oscillations comprising first and second networks constituting means for determining the frequency of said oscillations, at least one of the arms of each of said networks comprising a two-terminal sub-network including a plurality of sections of reactance and resistance elements, a pair of electronic gain devices connected with each of said respective networks, the input or control electrodes of each of said respective pairs of electronic devices having connections with opposite junctions of the arms of said respective networks, the cathode electrodes of each of said respective pairs of electronic devices having a common cathode impedance connection, the output or anode electrode of one of said electronic devices of each said pairs of electronic devices having a loop circuit connection with said input or control electrodes of the other of said pairs of electronic devices, said anode or output electrodes of said two pairs of electronic devices having voltages in substantially quadrature phase relation with respect to each other, and means for taking off said oscillations from at least one of said anode electrodes.

5. Apparatus for producing oscillations comprising first and second systems, each of said systems including a frequency-determining network and a pair of amplifying electronic gain devices connected with each of said respective networks, the input or control electrodes of each of said respective pairs of electronic devices being connected with said respective networks, the cathode electrodes of each of said respective pairs of electronic devices having a cathode impedance connection in circuit with the anode-to-cathode space current path thereof, the output or anode electrode of at least one of said pair of electronic devices of one of said systems having a connection with said network of the other of said systems for feeding energy thereto, at least one of said anode electrodes of said two pairs of electronic devices having an output circuit connection for taking off said output oscillations therefrom, at least one of the arms of each of said networks comprising a two-terminal sub-network including a plurality of sections of reactance and resistance elements, the remaining arms of each of said networks comprising impedance arms, two adjacent arms of said remaining arms of at least one of said networks being arms having relatively variable impedance values for thereby constituting means for varying said frequency of said oscillations.

6. Apparatus in accordance with claim 5, said remaining arms of each of said networks comprising resistance elements, two adjacent arms of said remaining arms of each of said networks comprising gang controlled potentiometers and constituting means for varying said frequency of said oscillations over a range of frequency values, and amplitude control means connected with said output circuit for regulating the amplitude of said oscillations over said range of frequency values.

7. Apparatus in accordance with claim 5, at least one of said two adjacent arms comprising a signal responsive device for varying the impedance value of at least one of said arms of at least one of said networks for thereby varying said frequency of said oscillations over a range of frequency values.

8. Apparatus for producing oscillations comprising a four-arm frequency determining bridge and an amplifier source of gain having input circuit electrodes connected with opposite junctions at the opposite ends of two adjacent arms of said four-arm bridge, and loop circuit means for transmitting oscillations from the output of said source of gain into the input thereof through said bridge, at least one arm of said four-arm bridge comprising a two-terminal network including series and parallel combinations of reactance and resistance elements, said source of gain comprising a pair of electronic devices having input circuit control grid electrodes respectively connected with said opposite junctions of said four-arm bridge.

9. Apparatus for producing oscillations comprising first and second tandem-connected systems, each of said systems including a four-arm frequency determining bridge and an amplifier gain source comprising a pair of electronic devices having input circuit control grid electrodes respectively connected with opposite junctions at the opposite ends of two adjacent arms of each of said respective four-arm bridges, loop circuit means for transmitting oscillations from the output of each of said systems into the input of the other of said systems, at least one of the arms of each of said bridges comprising a two-terminal network including a plurality of sections of reactance and resistance elements.

10. Apparatus in accordance with claim 9, said plurality of sections of each of said respective networks being a plurality of series-connected sections of reactance and resistance elements, said resistance elements of said series-connected sections of each of said respective networks having substantially equal resistance values and said reactance elements of said series-connected sections of said respective networks being capacitance elements set in substantially geometric ratio whereby each successive capacitance element of said sections has a successively higher capacitance value which is substantially a constant factor times the next smaller capacitance value of the capacitance element of the adjacent section of each of said respective networks.

11. Apparatus in accordance with claim 10, said respective networks being substantially similar networks.

FRITHIOF B. ANDERSON.

REFERENCES CITED

The following references are of record in the file of this patent:

UNITED STATES PATENTS

| Number | Name | Date |
|---|---|---|
| 2,017,708 | Bedford | Oct. 15, 1935 |
| 2,173,427 | Scott | Sept. 19, 1939 |
| 2,356,248 | Koren | Aug. 22, 1944 |
| 2,441,567 | Darlington | May 18, 1948 |
| 2,444,084 | Artz | June 29, 1948 |
| 2,451,858 | Mork | Oct. 19, 1948 |
| 2,486,984 | Rowe | Nov. 1, 1949 |
| 2,492,184 | Royden | Dec. 27, 1949 |

FOREIGN PATENTS

| Number | Country | Date |
|---|---|---|
| 395,596 | Great Britain | July 20, 1933 |

OTHER REFERENCES

Wireless World, article entitled "Single-Valve A. F." pages 82–84, March 1948. (Copy in 250–36–22.)